US012168244B2

(12) United States Patent
Sreenivasan et al.

(10) Patent No.: US 12,168,244 B2
(45) Date of Patent: Dec. 17, 2024

(54) NANOSCALE THIN FILM DEPOSITION SYSTEMS

(71) Applicant: Board of Regents, The University of Texas System, Austin, TX (US)

(72) Inventors: Sidlgata V. Sreenivasan, Austin, TX (US); Parth Pandya, Austin, TX (US); David Choi, Austin, TX (US); Shrawan Singhal, Austin, TX (US); Lawrence Dunn, Austin, TX (US)

(73) Assignee: Board of Regents, The University of Texas System, Austin, TX (US)

(*) Notice: Subject to any disclaimer, the term of this patent is extended or adjusted under 35 U.S.C. 154(b) by 0 days.

(21) Appl. No.: 17/801,481

(22) PCT Filed: Feb. 25, 2021

(86) PCT No.: PCT/US2021/019732
§ 371 (c)(1),
(2) Date: Aug. 22, 2022

(87) PCT Pub. No.: WO2021/173873
PCT Pub. Date: Sep. 2, 2021

(65) Prior Publication Data
US 2023/0088746 A1 Mar. 23, 2023

Related U.S. Application Data

(60) Provisional application No. 62/981,182, filed on Feb. 25, 2020.

(51) Int. Cl.
*B05D 3/14* (2006.01)
*B05D 3/06* (2006.01)
(Continued)

(52) U.S. Cl.
CPC ............. *B05D 3/148* (2013.01); *B05D 3/067* (2013.01); *B05D 3/147* (2013.01);
(Continued)

(58) Field of Classification Search
CPC ........ B05D 3/148; B05D 3/067; B05D 3/147; B05D 3/068; B05D 3/0493;
(Continued)

(56) References Cited

U.S. PATENT DOCUMENTS 8,027,086 B2  9/2011 Guo et al.
8,303,291 B2  11/2012 Kirchner et al.
(Continued)

FOREIGN PATENT DOCUMENTS

CN  106444275 A  2/2017

OTHER PUBLICATIONS

X-Rite InkFormulation_6_Manual (Year: 2010).*
(Continued)

*Primary Examiner* — Jason S Uhlenhake
*Assistant Examiner* — Alexander D Shenderov
(74) *Attorney, Agent, or Firm* — Robert A. Voigt, Jr.; Shackelford, McKinley & Norton, LLP

(57) ABSTRACT

A method and system for nanoscale precision programmable profiling on substrates. Profiling material is dispensed on a substrate or a superstrate. The superstrate is brought in contact with the substrate. The profiling material is then cured after bringing the superstrate in contact with the substrate. The superstrate is separated from the substrate after curing. An optical metrology of points on the substrate corresponding to the final substrate profile is then performed.

14 Claims, 19 Drawing Sheets

(51) Int. Cl.
  *B29D 11/00* (2006.01)
  *B32B 37/00* (2006.01)
  *B41J 2/01* (2006.01)
  *B82Y 35/00* (2011.01)
  *G01B 13/22* (2006.01)

(52) U.S. Cl.
  CPC .... *B29D 11/00432* (2013.01); *B29D 11/0073* (2013.01); *B32B 37/0038* (2013.01); *B41J 2/01* (2013.01); *B82Y 35/00* (2013.01); *G01B 13/22* (2013.01)

(58) Field of Classification Search
  CPC .. B05D 2350/33; B05D 3/12; B05D 2252/02; B29D 11/00432; B29D 11/0073; B32B 37/0038; B41J 2/01; B82Y 35/00; G01B 13/22; G02B 27/0025
  USPC .......................................................... 347/2
  See application file for complete search history.

(56) References Cited

U.S. PATENT DOCUMENTS

| | | | |
|---|---|---|---|
| 9,987,653 | B2 | 6/2018 | Sreenivasan et al. |
| 2002/0186368 | A1* | 12/2002 | Rosengaus ......... G01N 21/9501 356/237.2 |
| 2011/0115130 | A1 | 5/2011 | Kirchner et al. |
| 2014/0216287 | A1* | 8/2014 | Zwadlo .................. B82Y 10/00 101/483 |
| 2016/0082711 | A1* | 3/2016 | Barwicz ..................... C09J 5/00 156/379.8 |
| 2017/0106399 | A1* | 4/2017 | Sreenivasan ............... B41J 2/01 |
| 2017/0333940 | A1 | 11/2017 | Sreenivasan et al. |

OTHER PUBLICATIONS

International Search Report for International Application No. PCT/US2021/019732 dated Jun. 8, 2021, pp. 1-2.

Written Opinion of the International Searching Authority for International Application No. PCT/US2021/019732 dated Jun. 8, 2021, pp. 1-7.

Extended European Search Report for European Patent Application No. 21 760 079.0 issued on Mar. 13, 2024, pp. 1-7.

Search Report for Singapore Patent Application No. 11202252506X dated May 13, 2024, pp. 1-4.

Written Opinion for Singapore Patent Application No. 11202252506X dated May 14, 2024, pp. 1-7.

Ochiai et al., "Development of UV-Curable Liquid for In-Liquid Fluorescence Alignment in Ultraviolet Nanoimprint Lithography," Japanese Journal of Applied Physics, vol. 57, 2018, pp. 1-5.

* cited by examiner

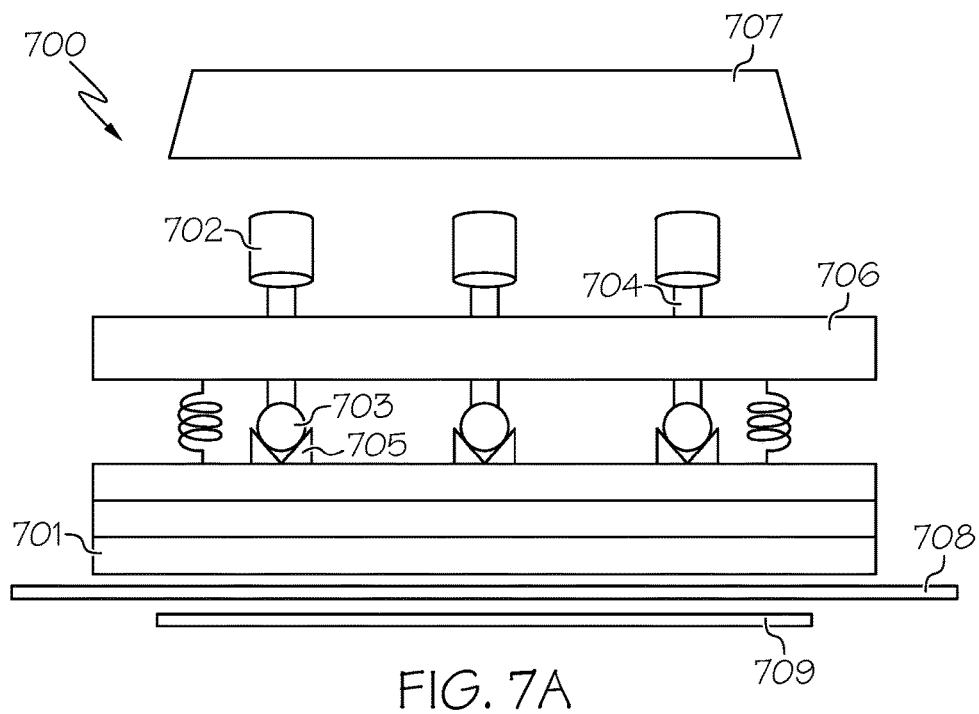
FIG. 7A
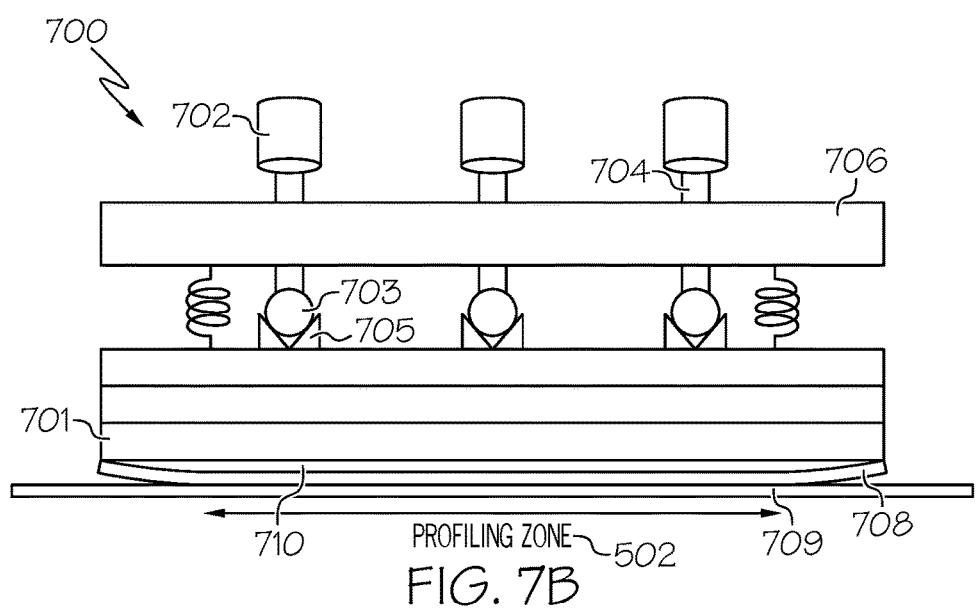
FIG. 7B
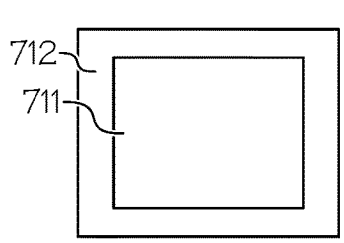
FIG. 7C1
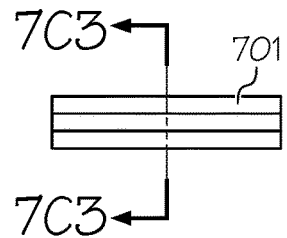
FIG. 7C2
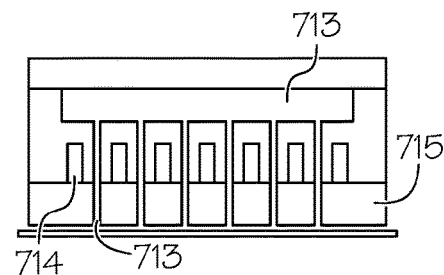
FIG. 7C3

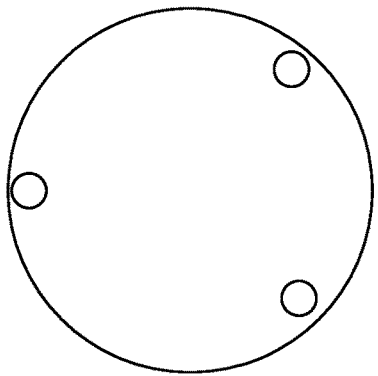
FIG. 9B
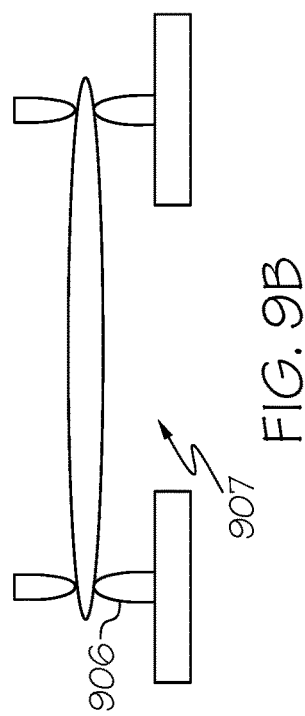
FIG. 9C
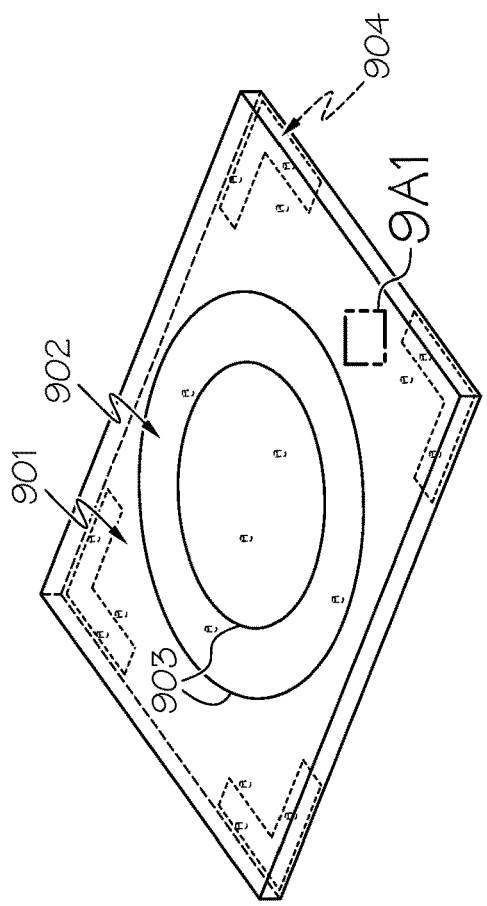
FIG. 9A
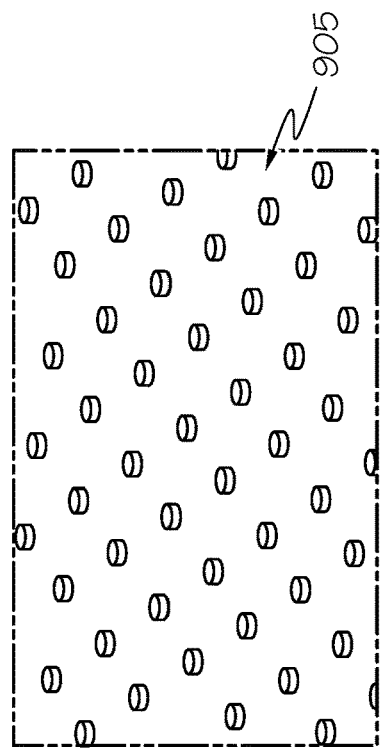
FIG. 9A1

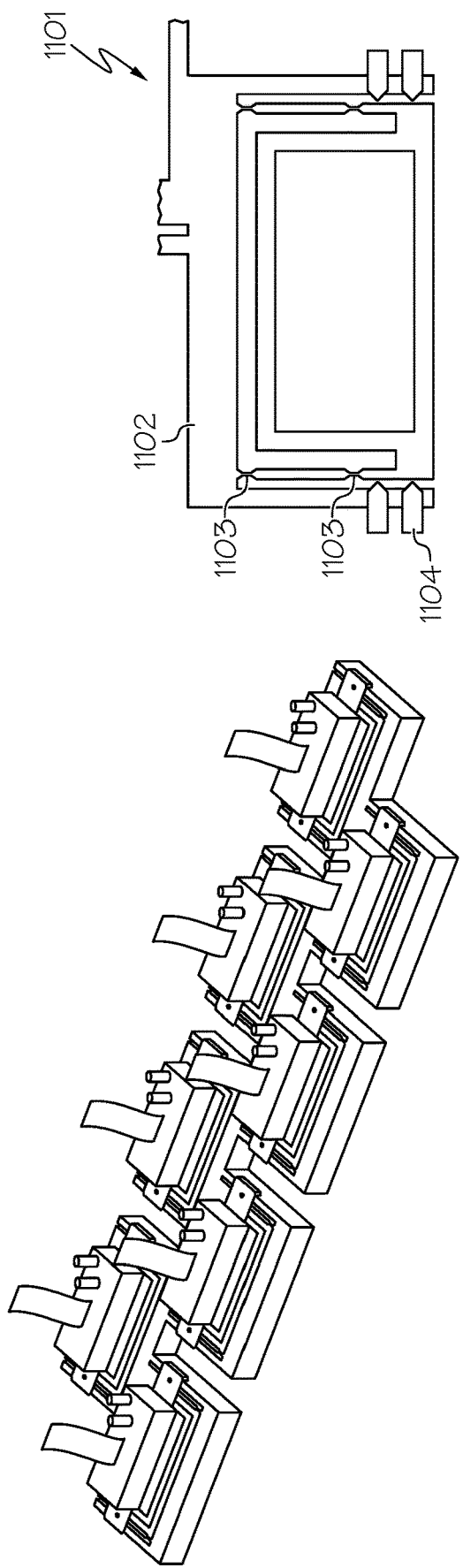
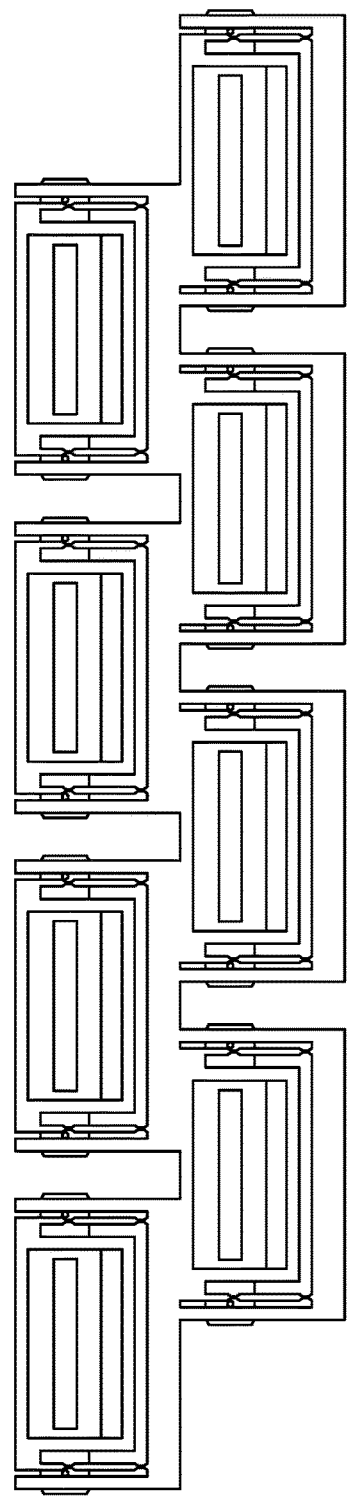
FIG. 11B
FIG. 11C
FIG. 11A

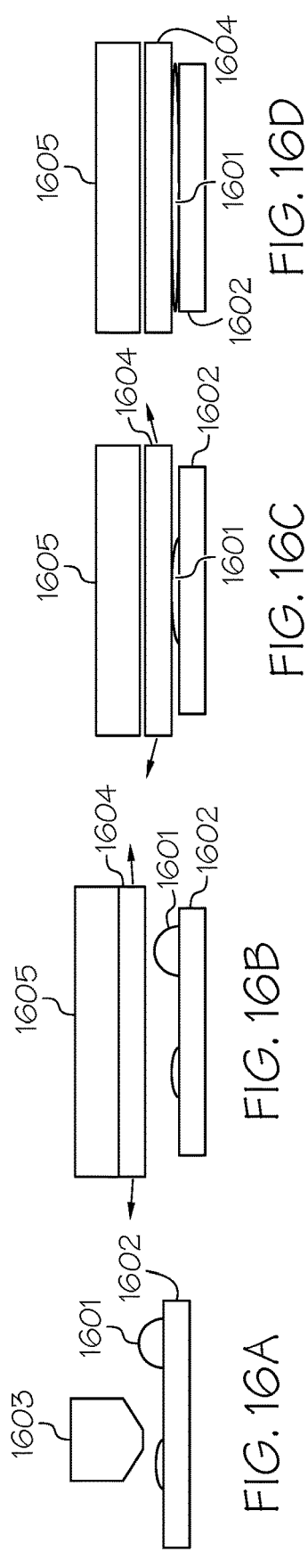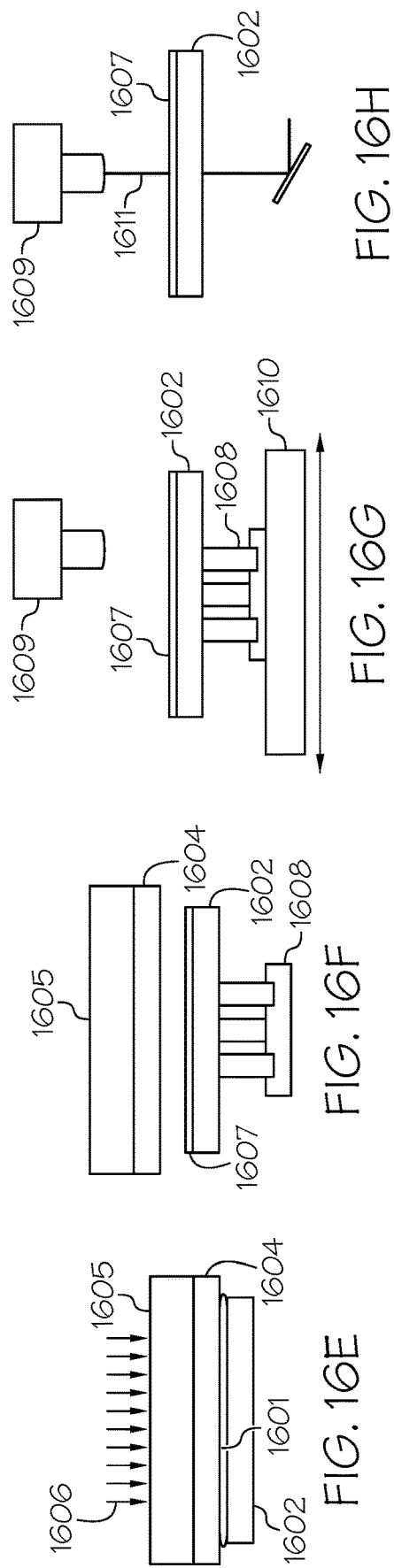

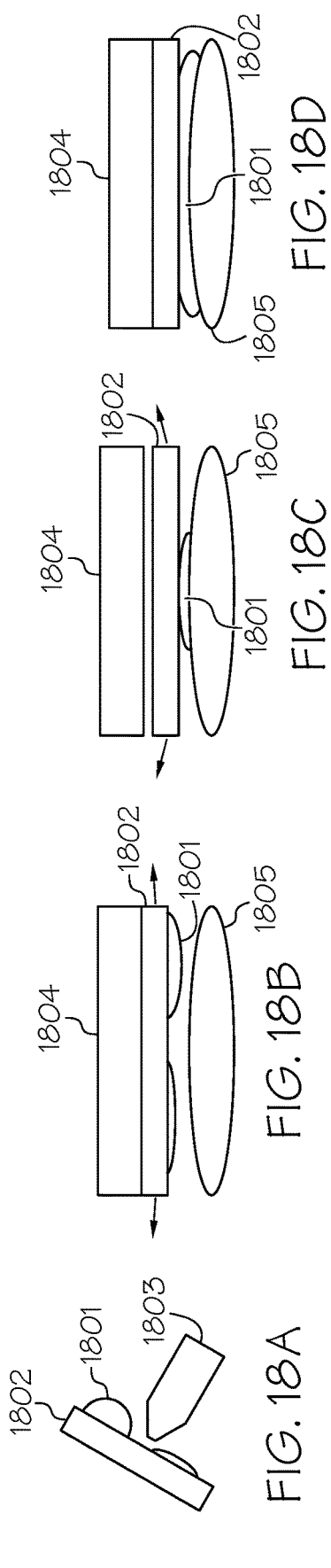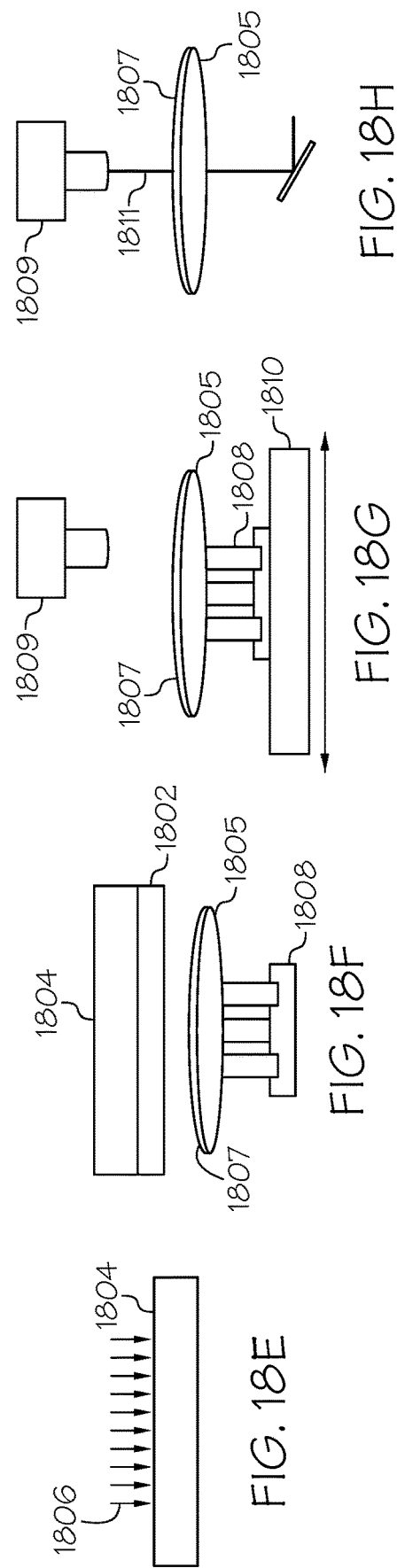

NANOSCALE THIN FILM DEPOSITION SYSTEMS

CROSS REFERENCE TO RELATED APPLICATIONS

This application claims priority to U.S. Provisional Patent Application Ser. No. 62/981,182 entitled "Nanoscale Precision Programmable Profiling: Apparatus and Process," filed on Feb. 25, 2020, which is incorporated by reference herein in their entirety.

TECHNICAL FIELD

The present invention relates generally to nanoscale thin film deposition, and more particularly to nanoscale precision programmable profiling.

BACKGROUND

In the field of electronic devices, roll-to-roll processing, also known as web processing, reel-to-reel processing or R2R, is the process of creating electronic devices on a roll of flexible plastic or metal foil. In other fields predating this use, it can refer to any process of applying coatings, printing, or performing other processes starting with a roll of a flexible material and re-reeling after the process to create an output roll. These processes, and others, such as sheeting, can be grouped together under the general term converting. When the rolls of material have been coated, laminated or printed they can be subsequently slit to their finished size on a slitter rewinder.

While R2R processing is an inexpensive process, it has not been able to be utilized for precise nanoscale surface profiling.

Furthermore, current technologies for realizing optoelectronic devices, such as metal mesh transparent conducting electrodes, wire grid polarizers and light-trapping gratings, are limited to rigid substrates, lack the necessary patterning resolution, involve inefficient metal lift-off/etch process and/or a transfer printing step.

SUMMARY

In one embodiment of the present invention, a system for nanoscale precision programmable profiling comprises a profiling module, where the profiling module has an inkjet for dispensing profiling material. The system further comprises a subsystem for handling a roll-based superstrate, where the superstrate is used to form a contiguous film of the profiling material between the superstrate and a substrate. The system additionally comprises a subsystem for curing the profiling material. Furthermore, the system comprises a metrology module.

In another embodiment of the present invention, a method for nanoscale precision programmable profiling on substrates comprises dispensing profiling material on a first portion of a substrate or a first portion of a superstrate. The method further comprises bringing a second portion of the superstrate in contact with a second portion of the substrate. The method additionally comprises sandwiching the profiling material between a third portion of the superstrate and a third portion of the substrate. Furthermore, the method comprises curing the profiling material. Additionally, the method comprises separating the superstrate from the substrate after the curing.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIGS. 7A-7B and 7C1-7C3 illustrate the UV transparent vacuum chuck with gap measurement sensors in accordance with an embodiment of the present invention;

FIGS. 9A, 9A1, 9B-9C illustrate the substrate chucks with transparent central zone for optical metrology in accordance with an embodiment of the present invention;

FIGS. 11A-11C illustrate an inkjet assembly and fixture for large width ink jetting in accordance with an embodiment of the present invention;

FIGS. 16A-16H depict the cross-sectional views for performing optical metrology at all points on the substrate using the steps described in FIG. 15 in accordance with an embodiment of the present invention;

FIGS. 18A-18H depict the cross-sectional views for performing optical metrology at all points on a curved substrate for nP3 using the steps described in FIG. 17 in accordance with an embodiment of the present invention.

DETAILED DESCRIPTION

In the field of electronic devices, roll-to-roll processing, also known as web processing, reel-to-reel processing or R2R, is the process of creating electronic devices on a roll of flexible plastic or metal foil. In other fields predating this use, it can refer to any process of applying coatings, printing, or performing other processes starting with a roll of a flexible material and re-reeling after the process to create an output roll. These processes, and others, such as sheeting, can be grouped together under the general term converting. When the rolls of material have been coated, laminated or printed they can be subsequently slit to their finished size on a slitter rewinder.

While R2R processing is an inexpensive process, it has not been able to be utilized using precise nanoscale patterning.

The principles of the present invention provide the means for nanoscale precision programmable profiling. In particular, the principles of the present invention relate to a novel process called Nanoscale Precision Programmable Profiling (nP3) and its apparatus. Instances of the apparatus for performing nP3 on flat and curved substrates are described herein. In one embodiment, a flexible web, mounted on a web handling system capable of removing a protective film from the web and reapplying a protective film, is used as a superstrate. An inkjet is used to dispense a programmable pattern of UV curable profiling material on a substrate or superstrate. The superstrate and substrate with profiling material between them are brought in contact through normal force generated by air pressure on the superstrate side and a vertical-tip-tilt stage on the substrate side. The air pressure is supplied through a UV transparent chuck capable of chucking the web at the edges while transmitting UV light through the center. Once drops spread due to superstrate-substrate contact, they are UV cured and the superstrate is separated from the substrate leaving behind cured profiling material with the desired surface profile on the substrate. The substrate is mounted on a chuck on a linear stage which carries it to the metrology station for real-time feedback. The substrate is brought back to the profiling zone for further processing, if needed. At any time, the location of the substrate is known to an accuracy of 10 micrometers or lower with respect to a reference.

Figure 1:
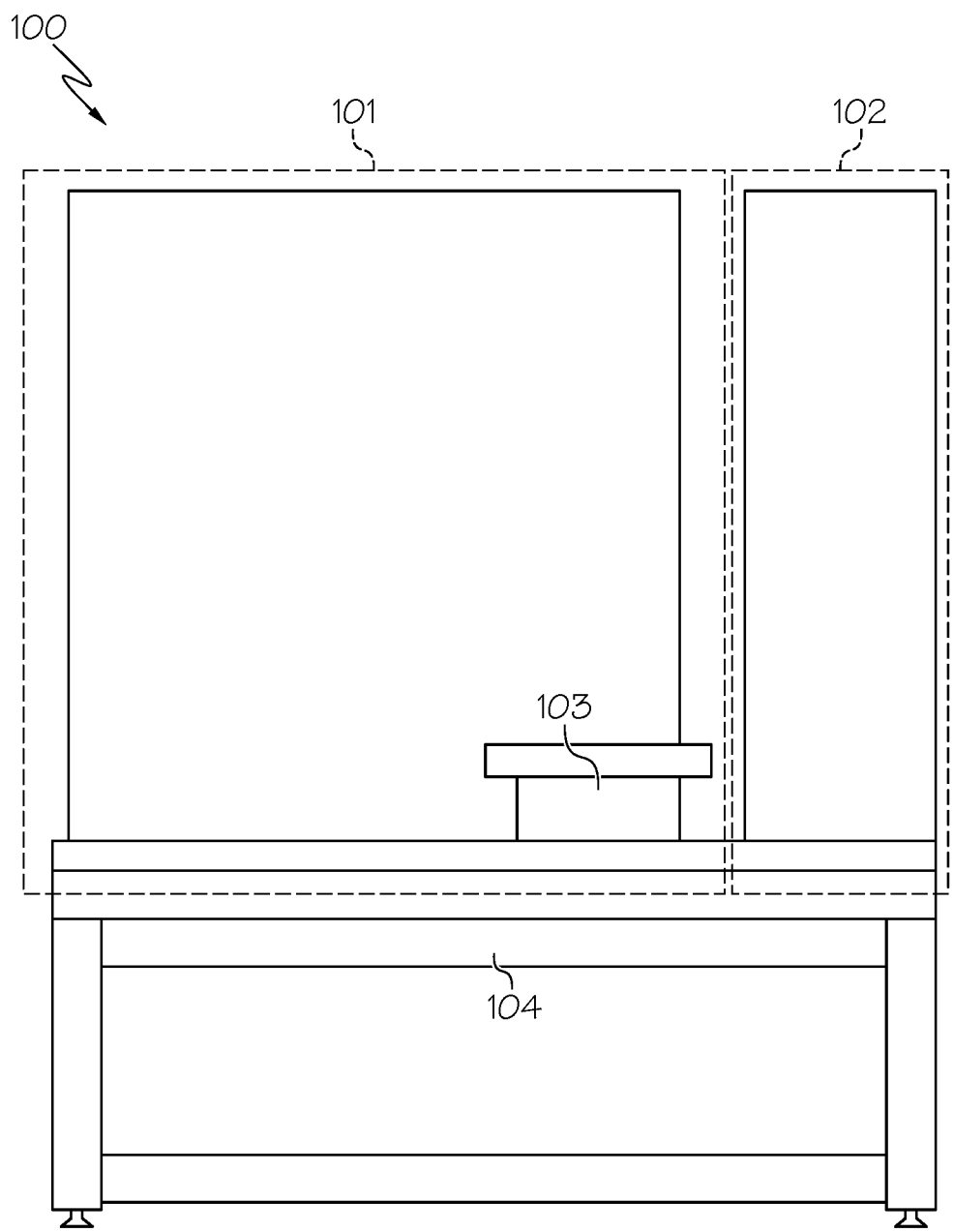
FIG. 1 is a schematic view of the nP3 apparatus in accordance with an embodiment of the present invention.

Referring now to the Figures in detail, FIG. 1 is a schematic view of the nP3 apparatus 100 in accordance with an embodiment of the present invention.

The nP3 apparatus 100 consists of 2 main subsystems: profiling 101 and metrology 102. The profiling subsystems includes a web handling module consisting of unwind and rewind rollers, rollers for interleaving and de-interleaving, drive rollers, nip rollers for tension control and precision rollers to ensure a flat zone. The sidelay ensures that web is wound on each other without lateral error (telescoping). An inkjet printhead on an alignment stage dispenses profiling material drops. The UV lamp and UV transparent (UVT) chuck are used to cure the profiling material and hold the superstrate in place while creating an air-pressure induced curvature to spread the profiling material drops. The voice coil motor driven flexure bearing stage holds the substrate chuck below the superstrate and is mounted on linear horizontal stages 103 as shown. The metrology subsystem includes a sensor for surface topography measurement (a Shack-Hartman sensor, an optical profilometer, an interferometer, an optical profilometer, a reflectometer or a spectrophotometer) mounted directly above the substrate. A laser beam is guided to transmit through the substrate through an automated telescopic system and is incident on the sensor. A telescopic system is necessary when dealing with curved substrates with a range of spherical powers. The laser beam alignment system includes a turn mirror which directs a horizontal laser beam vertical upwards through the substrate. In one embodiment, the nP3 apparatus 100 also has a communication module with allows transfer and exchange of data locally with another computer or with another data center/workstation located remotely (e.g., cloud-based datacenter, cloud-based workstation). This data can include metrology data, tool sensor data, drop pattern data, etc.

Referring again to FIG. 1, nP3 apparatus 100 further includes a granite base and support table 104.

Figure 2:
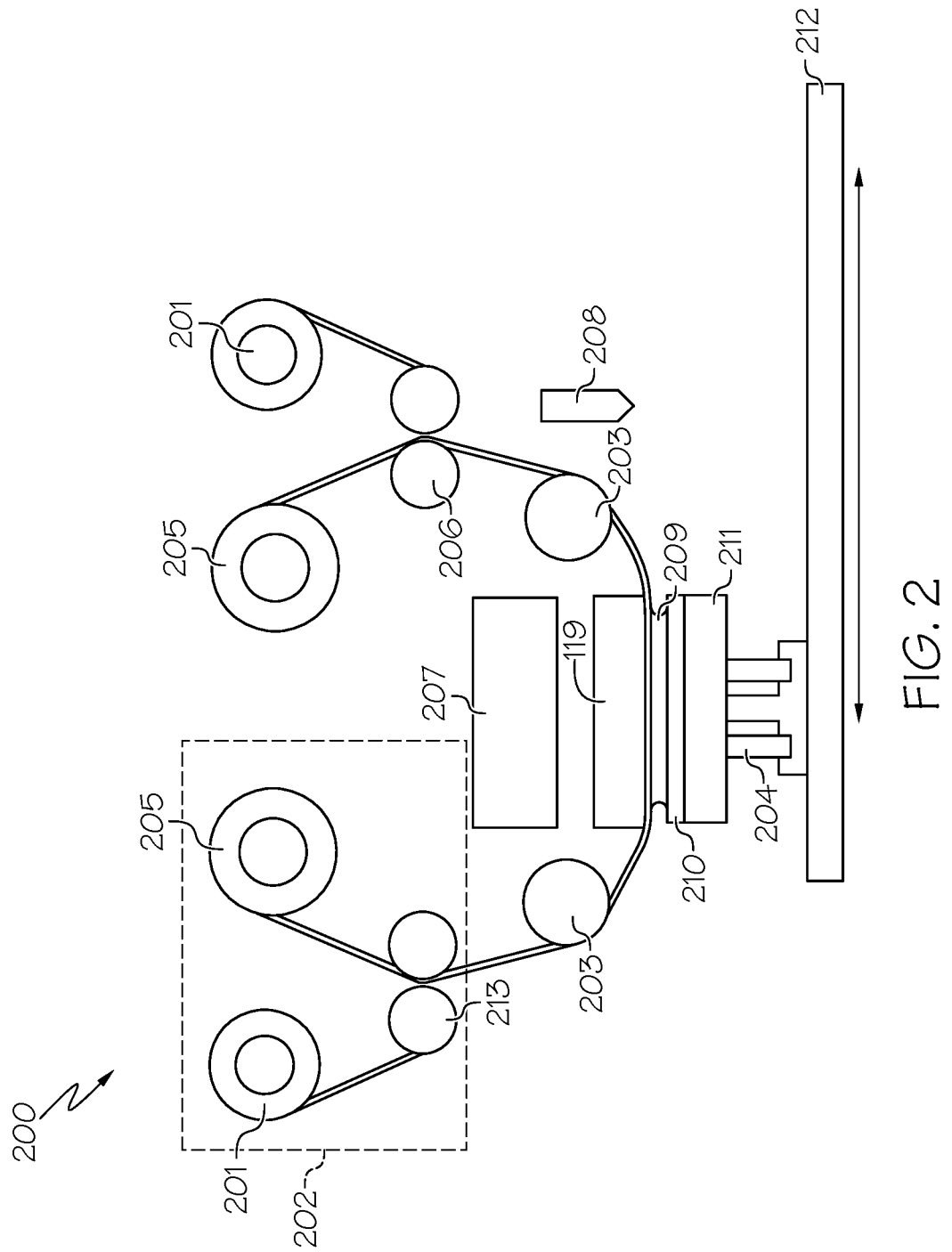
FIG. 2 is a schematic view of the profiling subsystem in the nP3 apparatus in accordance with an embodiment of the present invention.

Referring now to FIG. 2, FIG. 2 is a schematic view of the profiling subsystem 200 in nP3 apparatus 100 in accordance with an embodiment of the present invention.

As shown in FIG. 2, profiling subsystem 200 includes a motorized interleaf/de-interleaf rollers 201, nip roller 213, sidelay module 202, precision idlers 203, UV transparent vacuum chuck 119, voice coil motor (VCM) driven stage 204 for vertical, tip and tilt motion, motorized supply and take-up rollers 205, drive roller 206, curing module 207, stationary inkjet printhead 208, profiling material 209, rigid substrate 210, vacuum pin chuck 211 and large travel stage 212. In one embodiment, rigid substrate 210 is either nominally flat or nominally non-flat (e.g., spheres, aspheres). A "rigid" substrate, as used herein, refers to having permanent shape and form. "Nominally flat," as used herein, refers to a surface having an area of apparent contact being so large so that the individual contacts are dispersed and the forces acting through neighboring spots do not influence each other. "Nominally non-flat," as used herein, refers to a surface that is not nominally flat.

As illustrated in FIG. 2, inkjet printhead 208 is stationary with respect to the large travel direction 212.

Furthermore, FIG. 2 shows the web path followed by the superstrate and the interleaf film during removal and reapplication. In FIG. 2, tension control is achieved through a nip and drive roller assembly (see 213 and 206). In one embodiment, polyurethane rollers are used to apply normal pressure on drive roller 206 which improves friction and allows higher tension limited by motor capacity. In one embodiment, it is ensured that nip roller 213 is axially parallel to drive roller 206. A UV lamp is placed directly above the profiling zone. UV transparent chuck 119 is positioned between the superstrate and the UV lamp. Precision idlers 203 are shown which flatten the superstrate and ensure minimal out of plane errors and in plane shear errors. The voice coil motor stage 204 is mounted to a horizontal XY stage. The substrate is traversed from the jetting station to the profiling station and then to the metrology station using the XY stages.

Figure 3:
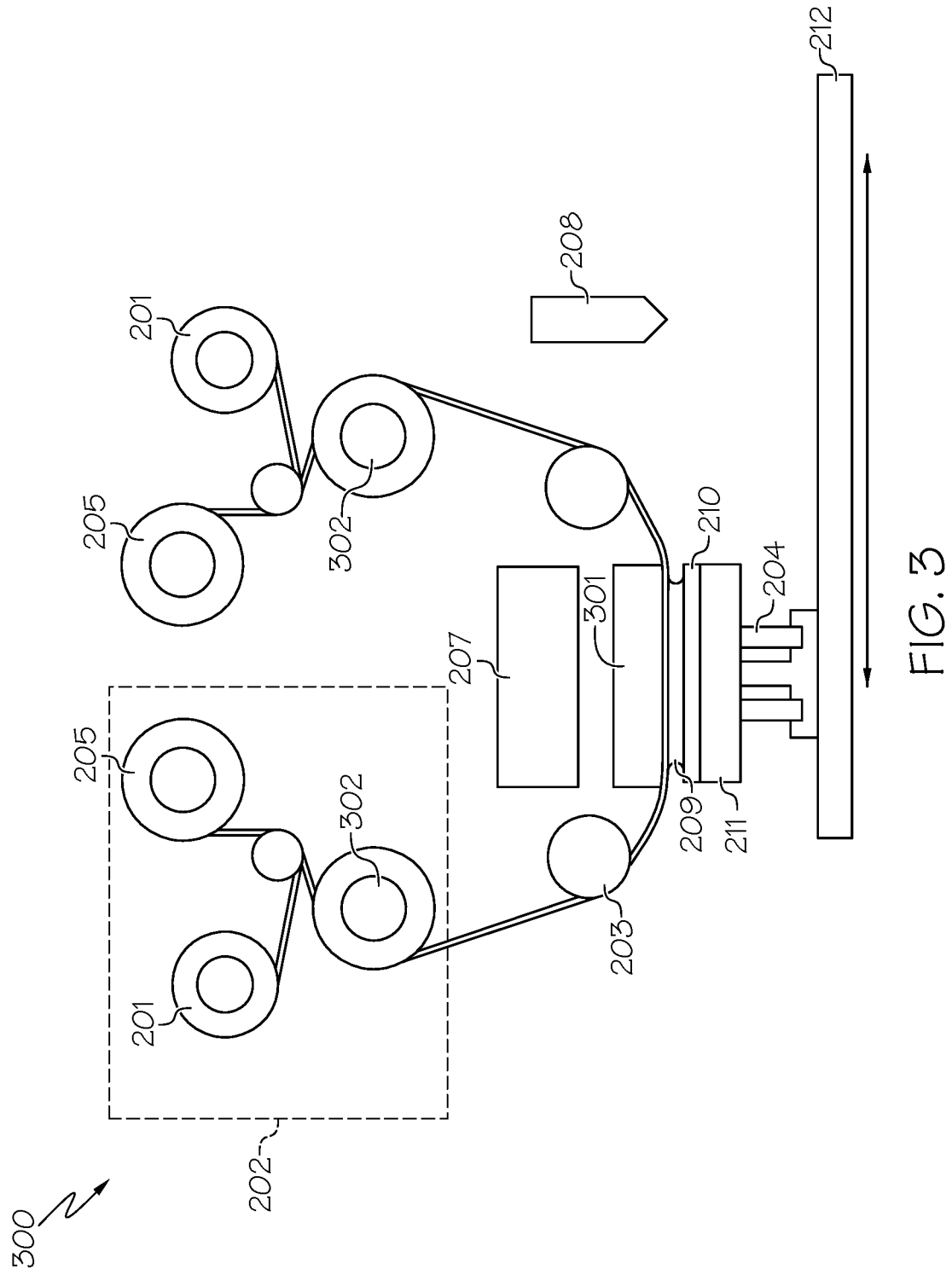
FIG. 3 is a schematic view of the profiling subsystem with an alternate web handling system in accordance with an embodiment of the present invention.

FIG. 3 is a schematic view of the profiling subsystem 300 with an alternate web handling system in accordance with an embodiment of the present invention. Profiling subsystem 300 is the same as profiling subsystem 200 of FIG. 2 except for the differences noted below.

Referring to FIG. 3, profiling subsystem 300 (in contrast to profiling subsystem 200) includes a UV transparent vacuum preloaded air bearing 301 and vacuum rollers 302.

As illustrated in FIG. 3, a pair of vacuum rollers 302 are used to provide tension to the superstrate in the profiling region. Vacuum rollers 302 provide tension without normal compressive force on the superstrate. This may be necessary if a sensitive material is deposited on the superstrate. The normal force created by the vacuum is sufficient to create the desired tension (~100-1000 N/m).

Figure 4:
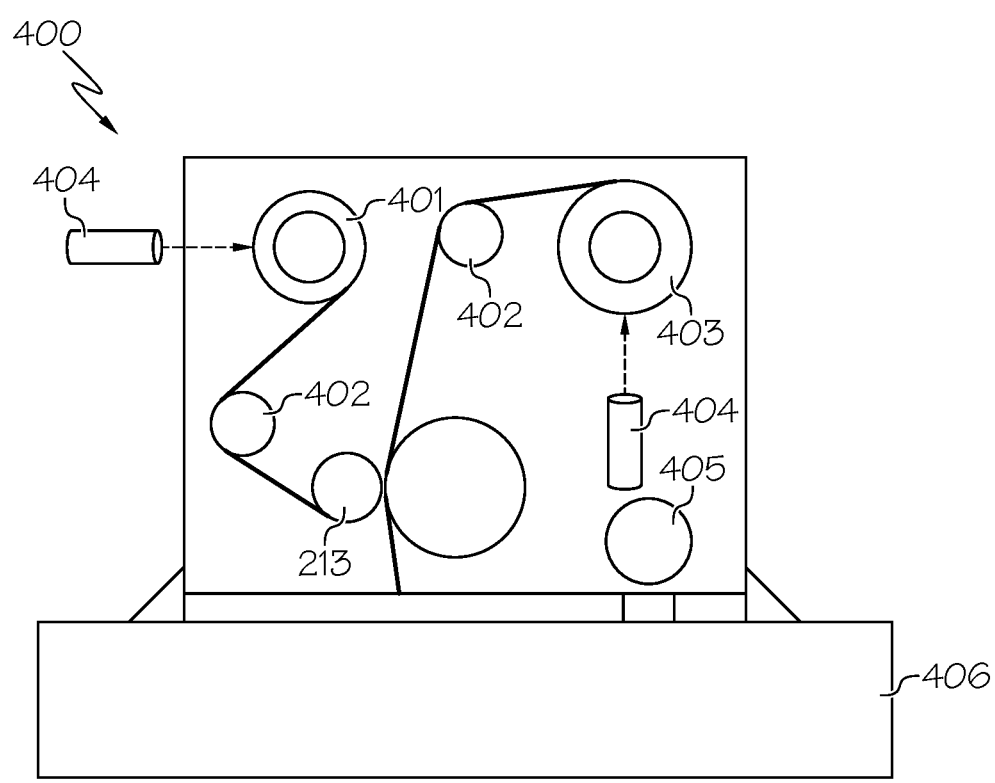
FIG. 4 illustrates the architecture of the sidelay mechanism in accordance with an embodiment of the present invention.

FIG. 4 illustrates the architecture of the sidelay mechanism 400 in accordance with an embodiment of the present invention.

Referring to FIG. 4 sidelay mechanism 400 includes motorized de-interleaf rollers 401, load cell rollers 402, nip roller 213, unwind supply roller 403, sensors 404 for reel diameter measurement, and linear motor 405 moving sidelay module 400 transverse to web with respect to stationary frame 406.

FIGS. 4A-4B, sidelay mechanism 400 includes a de-interleaf roller 401, load cell roller 402, nip roller 213, linear bearings 403 transverse to web motion, tie beams 103, edge sensor 105, unwind roller 404, load cell roller 405, drive roller 206, and sidelay actuator (out of plane motion) 104.

As shown in FIG. 4, a sidelay correction module 400 is used to ensure the web does not displace laterally due to accumulating errors (telescoping). In one embodiment, the load cell rollers 402 and nip roller 213 upstream of profiling zone are mounted on carriage that can translate in a perpendicular direction to web motion. A sensor 404 is used to locate lateral position of the superstrate, along with limit switches to detect end of travel range. A sub 100 micrometer alignment accuracy is obtained using sidelay correction mechanism 400.

Figure 5:
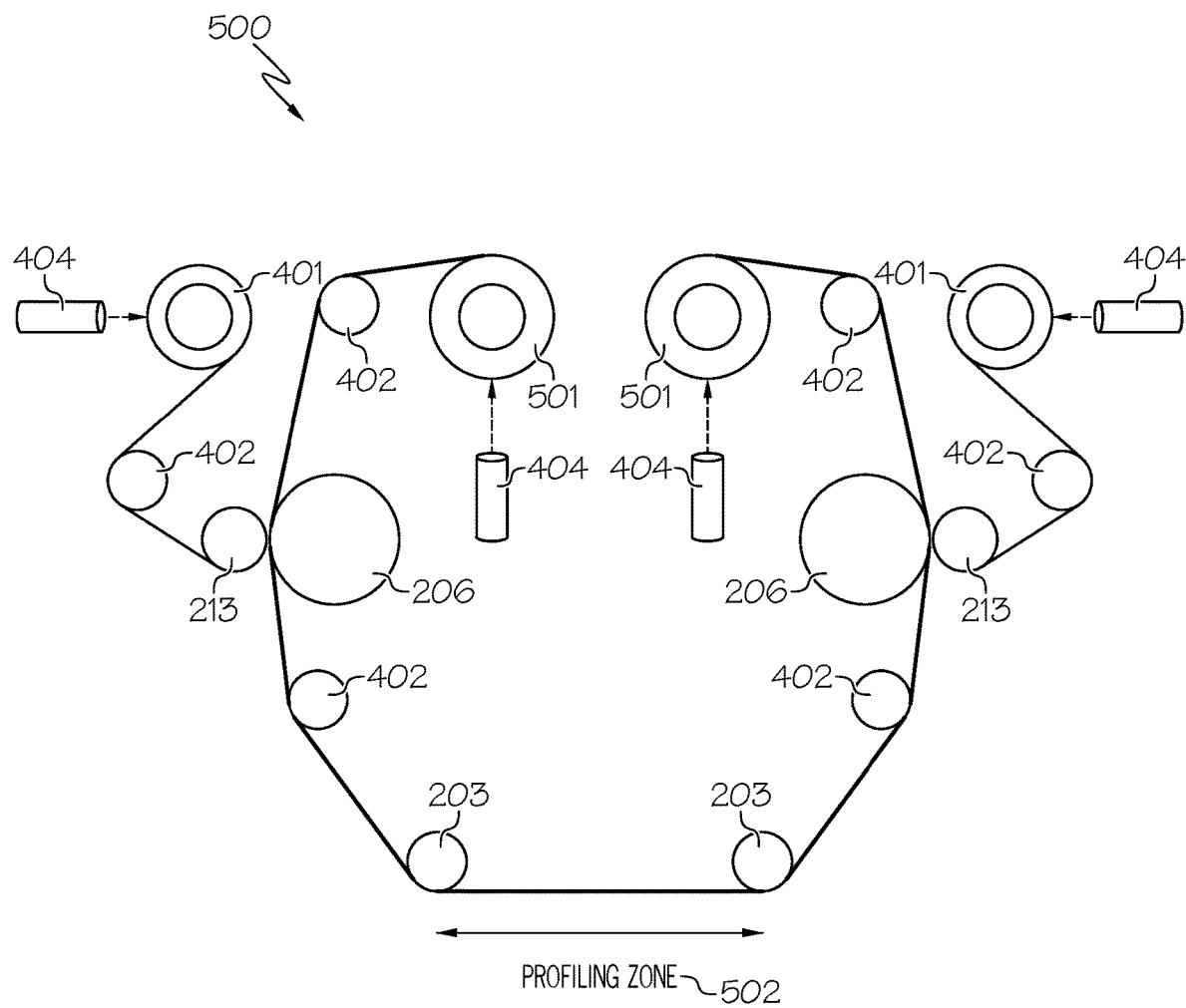
FIG. 5 illustrates the superstrate tension control system in accordance with an embodiment of the present invention.

FIG. 5 illustrates the superstrate tension control system 500 in accordance with an embodiment of the present invention.

As shown in FIG. 5, superstrate tension control system 500 includes motorized supply and rake-up rollers 501, motorized de-interleaf rollers 401, load cell rollers 402, nip roller 213, precision idler 203, drive roller 206 and sensors 404 for reel diameter measurement.

Tension control is maintained in the 3 regions as shown in FIG. 5. In one embodiment, nip roller 213 is used to maintain tension in the profiling zone 502. Unwind and rewind maintain overall web tension. Load cell rollers 402 and sensors 404 are used to calculate tension in each region. These sensor inputs are fed to the motion controller driving the motors and appropriate tension control is achieved.

Figure 6A:
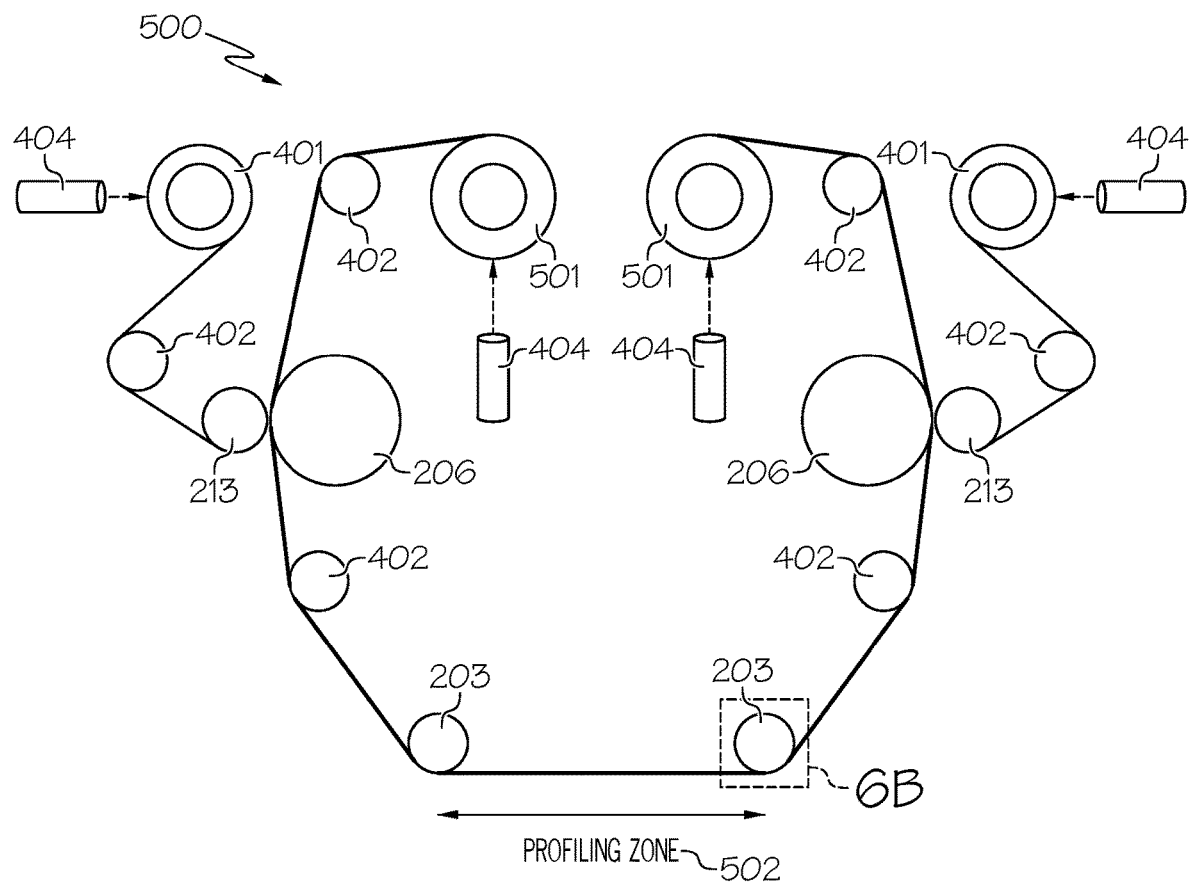
FIGS. 6A-6B illustrate the precision alignment system of idlers in the profiling zone in accordance with an embodiment of the present invention.
Figure 6B:
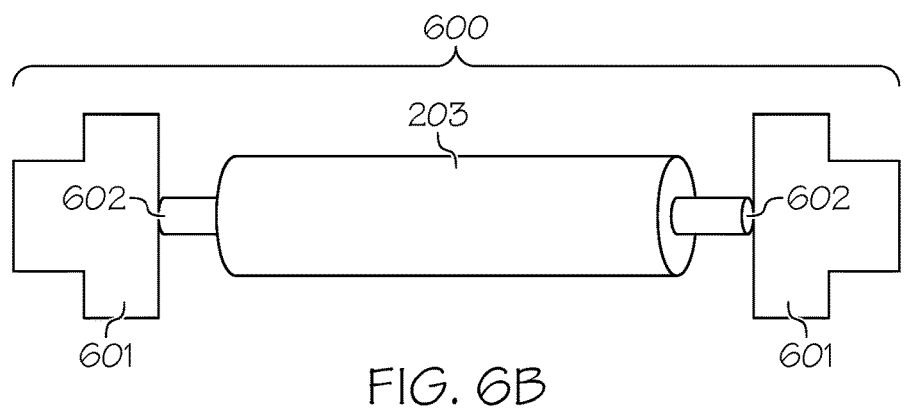

FIGS. 6A-6B illustrate the precision alignment system 600 of idlers in the profiling zone in accordance with an embodiment of the present invention.

As shown in FIGS. 6A-6B, system 600 includes YZ stages 601, self-aligning ball bearings 602 and a precision idler 203 (low runout).

FIGS. 6A-6B describe the precision idler system and the roller orientation adjustment mechanism. Precision idler roller 203 is mounted onto YZ stages 601 as shown. Self-aligning ball bearings 602 are used at both ends of roller 203. In one embodiment, YZ stages 601 are located on the sidewalls through a line boring. Laser tracking sensors can be used to measure misalignment between any 2 rollers in the system and flat profiling zone can be created (without web shear and out of plane errors).

FIGS. 7A-7B and 7C1-7C3 illustrate the UV transparent vacuum chuck 701 with gap measurement sensors in accordance with an embodiment of the present invention. Referring to FIG. 7A, FIG. 7A illustrates the side view of UV transparent (UVT) vacuum chuck 701 when the vacuum is off, the cavity air pressure is off, and the precision alignment system is in the dormant mode in accordance with an embodiment of the present invention. In such a mode, micrometer knobs 702 are mounted to the ball end 703 glued to the micrometer actuator via micrometer mounts 704. As shown in FIG. 7A, the ball ends 703 are protected via a ball sleeve 705. Additionally, as shown in FIG. 7A, in one embodiment, there may be a stationary plate 706 to which micrometers are fastened. Furthermore, as shown in FIG. 7A, UV light is emitted from UV lamp 707. Additionally, FIG. 7A illustrates superstrate web 708 and substrate 709.

FIG. 7B illustrates the side view of UV transparent (UVT) vacuum chuck 701 when the vacuum is on, the cavity air pressure is on, and the precision alignment system is in the chucking mode in accordance with an embodiment of the present invention. In such a mode, there exists an air cavity 710 with a gap of less than 100 micrometers between UV transparent vacuum chuck 701 and superstrate 708.

FIGS. 7C1-7C3 illustrate the side section view of UV transparent (UVT) vacuum chuck 701, which includes the UVT (ultraviolet transmitting) acrylic plate 711 and the porous region 712 with through holes 713 on edges to the chuck/convey web as shown in FIG. 7C3 illustrating the UV transparent region. FIG. 7C3 further illustrates vacuum supply 713 and bearing 714 with positive pressure supply. Additionally, FIG. 7C3 illustrates the bottom plate 715 of UVT vacuum chuck 701 that includes porous material to transit air pressure onto the web.

Figure 8A:
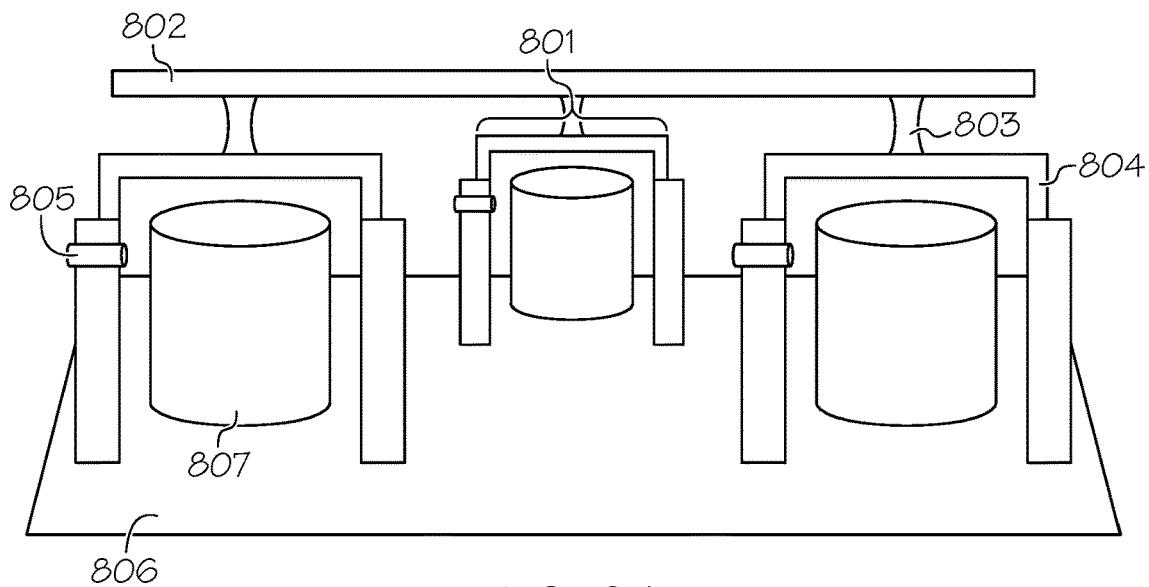
FIGS. 8A-8C illustrate the voice coil motor driven flexure bearing stage for vertical-tip-tilt motion in accordance with an embodiment of the present invention.
Figure 8B:
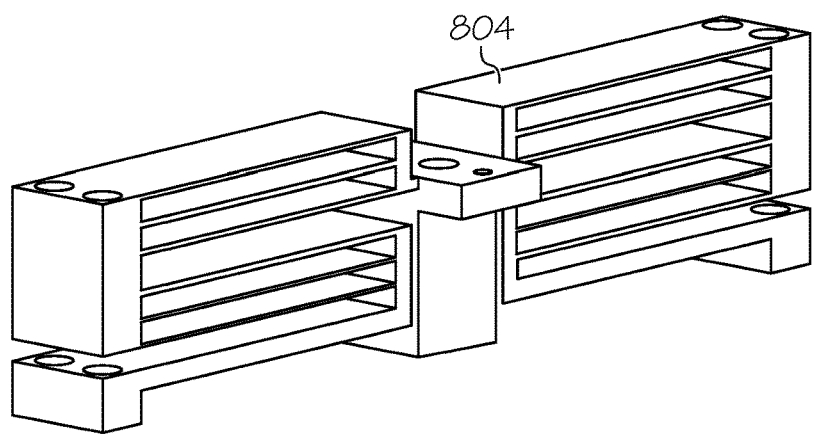
Figure 8C:
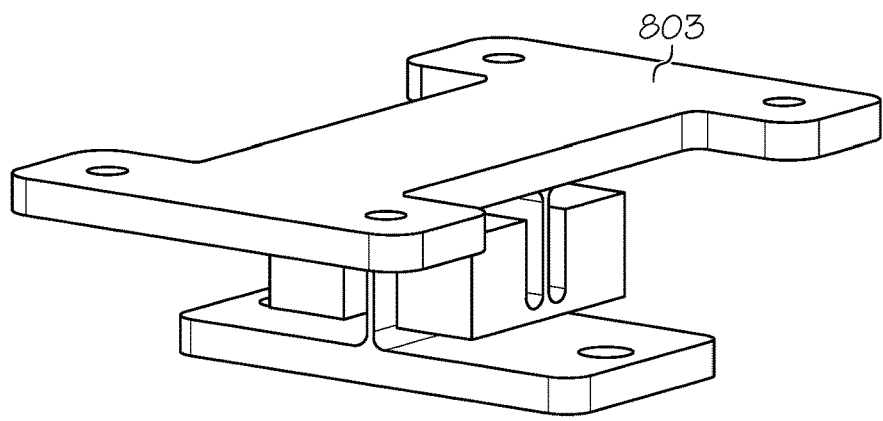

FIGS. 8A-8C illustrate the voice coil motor driven flexure bearing stage 204 for vertical-tip-tilt motion in accordance with an embodiment of the present invention.

Referring to FIGS. 8A-8C, FIGS. 8A-8C describe the stage for vertical motion and tip and tilt alignment. Three actuators 801 are mounted vertically on a base plate 802 as shown in FIG. 8A. The vertical motion of the actuators is defined by the compliant translational joints that are designed to increase range of motion while maintaining high stiffness. Limit switches and mechanical hard stops are added to sense the end of the travel range and avoid damage to the motors and bearings.

In particular, FIG. 8A illustrates a flexural universal bearing 803 (FIG. 8C includes a detailed drawing of flexural universal bearing 803) connected to base plate 802 and translational flexure bearing 804 (FIG. 8B includes a detailed drawing of translational flexure bearing 804). In one embodiment, a displacement sensor 805 is placed on translational flexure bearing 804 connected to stationary chassis 806. Additionally, as shown in FIG. 8A, each actuator 801 includes a voice coil motor 807.

FIGS. 9A, 9A1, 9B-9C illustrate the substrate chucks with transparent central zone for optical metrology in accordance with an embodiment of the present invention.

Referring to FIG. 9A, FIG. 9A illustrates the pin chuck for flat substrates with transparent central zone in accordance with an embodiment of the present invention. "Flat substrates," as used herein, refer to a substrate with a smooth and even surface without indentations.

FIG. 9A further illustrates chucking area with pins 901, transparent area 902 for metrology, embedded ring 903 to retain vacuum, and vacuum pads 904 to mount to base plate.

FIG. 9A1 illustrates a zoomed-in image 905 of pins in accordance with an embodiment of the present invention.

FIG. 9B illustrates pins 906 for chucking and transparent zone 907 for optical metrology in accordance with an embodiment of the present invention.

FIG. 9C illustrates the 3-point chuck for curved substrates in accordance with an embodiment of the present invention.

FIGS. 9A, 9A1, 9B-9C describe the substrate chucks in the case of a flat substrate and a curved substrate. An annular vacuum pin chuck 906 is used to support the flat substrate at the edges while an air cavity is created in the central region to create a curvature. In one embodiment, the curvature is used to ensure bubble mitigation. This allows central region 907 to be transparent to the laser beam necessary for optical metrology of surface topography. In the case of curved substrates, a 3-point chuck is used to chuck the substrate at the edges, leaving central region 907 transparent to laser beam. Both these chucks are mounted to a base plate on the voice coil motor driven stage using vacuum pads 904.

Figure 10B:
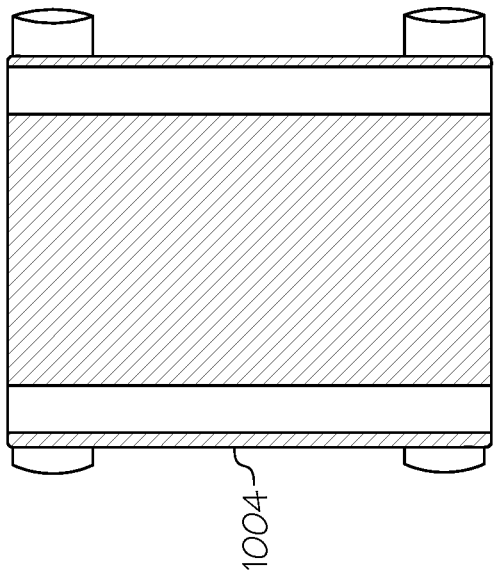
FIGS. 10A-10B illustrate the at-line mechanism for superstrate and substrate parallelism in accordance with an embodiment of the present invention.
Figure 10A:
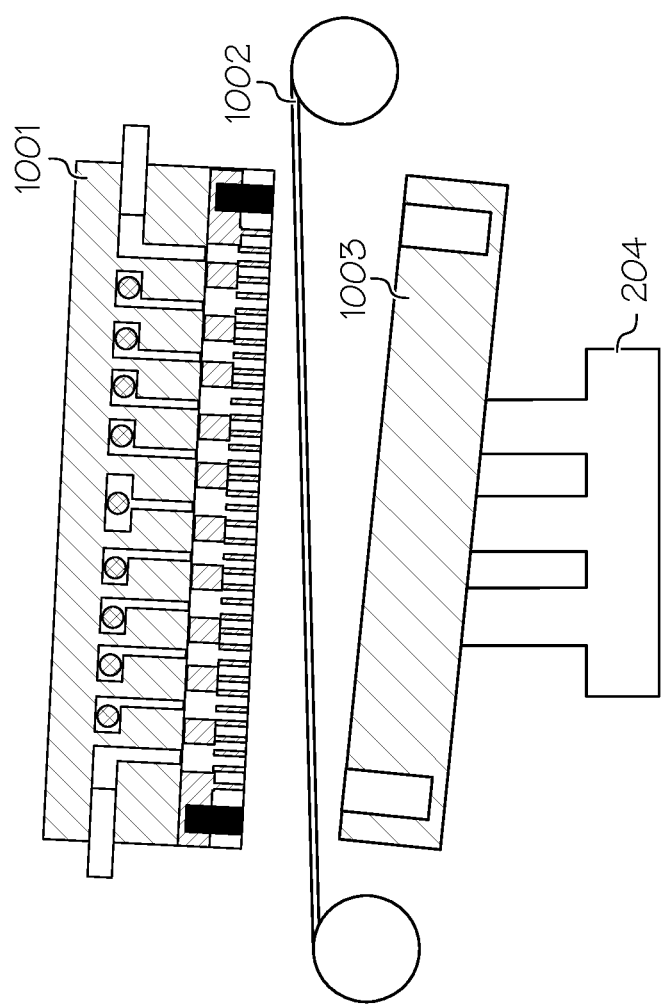

FIGS. 10A-10B illustrate the at-line mechanism for superstrate and substrate parallelism in accordance with an embodiment of the present invention.

Referring to FIG. 10A, FIG. 10A illustrates the UV transport chuck with incorporated capacitance sensors 1001, superstrate on precision idlers 1002, pin chuck with incorporated capacitance sensors 1003 and VCM stage 204 for vertical, tip and tilt motion. FIG. 10B illustrates the metallic film 1004 for at-line gap measurement through capacitance sensors.

FIGS. 10A-10B are a schematic view of the mechanism deployed to ensure parallelism between UV transparent chuck with incorporated capacitance sensors 1001, superstrate web on precision idlers 1002 and substrate chuck 1003. VCM stage 204 is automatically controlled. Substrate chuck 1003 mounted on VCM stage 204 and UVT chuck 1001 are incorporated with capacitive sensors. UVT chuck's pitch and roll angle is manually adjusted by mounting the air bearing on kinematic joints. The metallic superstrate web 1004 is made to traverse through precision idlers mounted on manual alignment stages which allows capacitive sensing. The measurements from the capacitance sensors allow the substrate chuck to be parallel to superstrate web 1002 and UVT chuck 1001 to be parallel to superstrate web 1002. Thereby, parallelism can be maintained between the 3 bodies with an accuracy of microradians.

FIGS. 11A-11C illustrate an inkjet assembly and fixture for large width ink jetting in accordance with an embodiment of the present invention.

Referring to FIG. 11A, FIG. 11A illustrates the large width inkjet assembly.

FIG. 11B illustrates the bottom view of the large width inkjet assembly.

FIG. 11C illustrates the inkjet fixture compliant mechanism design 1101 (Yθ motion). As shown in FIG. 11C, inkjet fixture compliant mechanism design 1101 includes a fixed body 1102, compliant revolute joints 1103 and manual actuators 1104.

Referring to FIGS. 11A-11C, in one embodiment, inkjet drops are deposited uniformly with an accuracy of <100 micrometers over a large width (~500 mm). Hence, every inkjet head is mounted on a stage with compliant bearings allowing motion in Y (transverse to web or plate) and θ. Combining multiple such inkjet stages provides a fixture with the necessary degrees of freedoms and sufficient range of motions to dispense drops uniformly. Alternatively, a smaller inkjet fixture can be mounted on a linear stage with an accuracy of <1 micrometers and be used to dispense drops along the width. In one embodiment, this apparatus may be necessary while dispensing profiling material on the superstrate web in the case of nP3 on curved substrate. For nP3 on flat substrates, the inkjet is mounted onto a manual stage with the following degrees of freedom: roll, pitch, vertical and horizontal axis transverse to substrate motion.

Figure 12A:
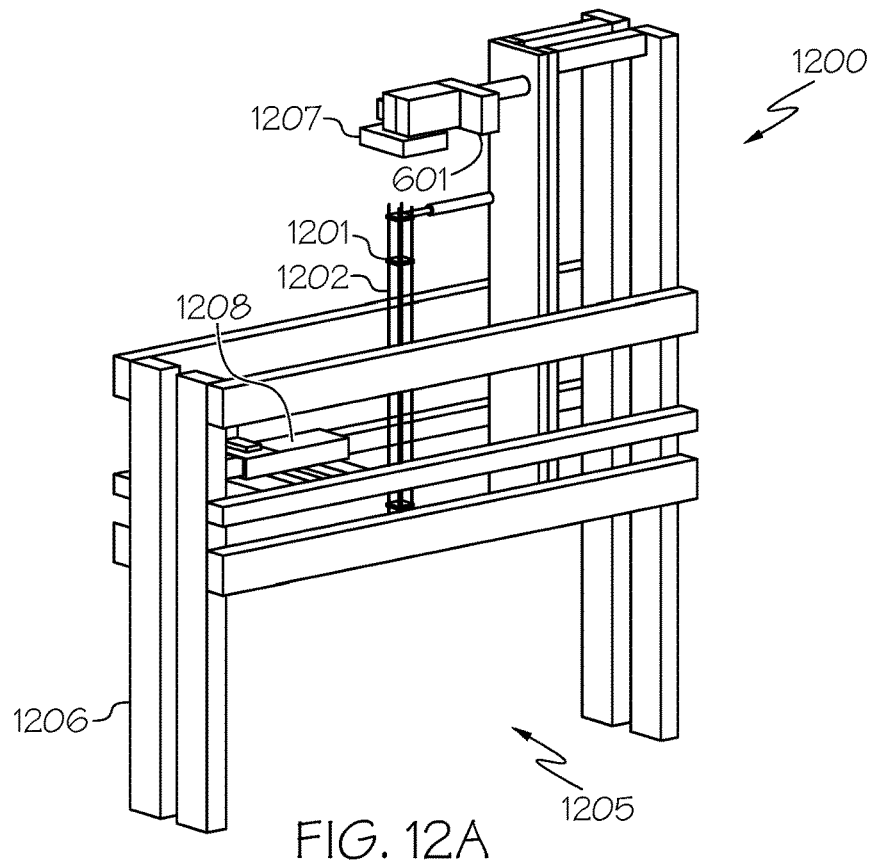
FIGS. 12A-12B illustrates the architecture of the nP3 metrology subsystem in accordance with an embodiment of the present invention.
Figure 12B:
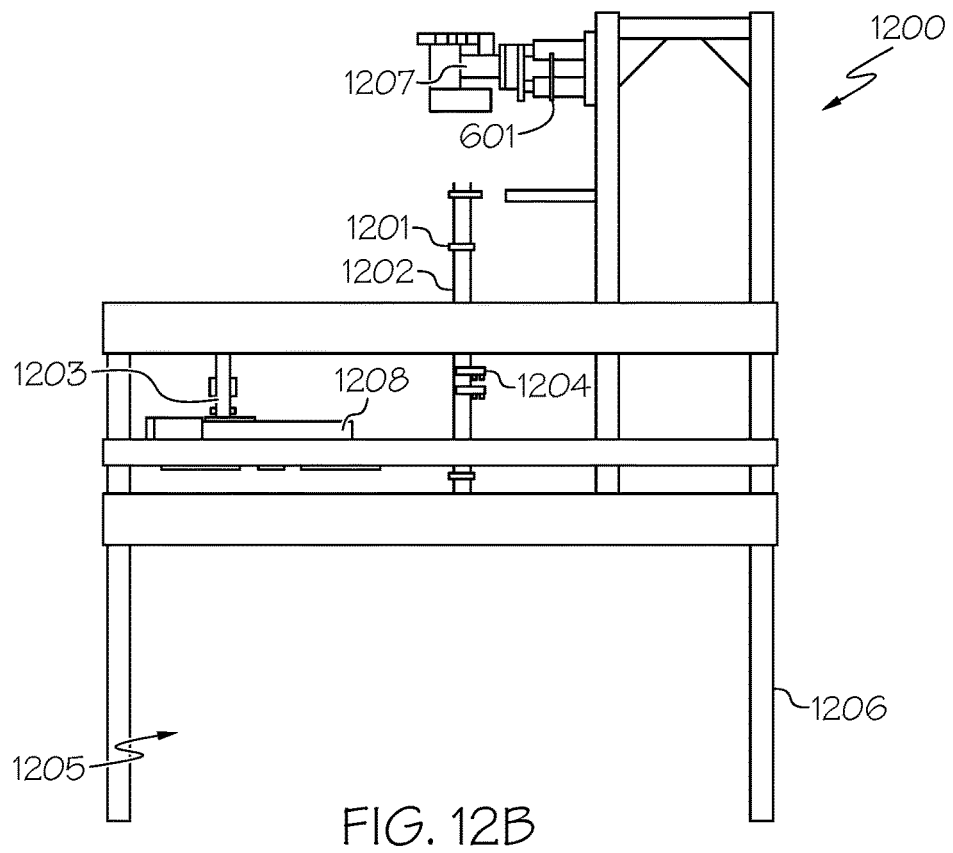

FIGS. 12A-12B illustrate the architecture of the nP3 metrology subsystem 1200 in accordance with an embodiment of the present invention.

Referring to FIGS. 12A-12B, FIGS. 12A-12B illustrate optical sensor 1207, alignment stages 601, telescoping lens 1201, cage mount hardware 1202, translating 45 degree mirrors 1203, stationary turn mirrors 1204, linear stage 1208, location 1205 of the substrate and VCM stage during metrology and aluminum extrusion mounting station 1206.

As shown in FIGS. 12A-12B, the metrology unit consists of a laser source and alignment mirrors directing the beam towards a stationary turn mirror 1204, which points the beam upwards. The beam can now transmit through the transparent substrate. Changes in the optical properties of the beam (intensity, amplitude, etc.) are created by surface topography as a function of deviation from a perfectly flat surface. To ensure the beam remains parallel while it is incident on the sensor face, an automated telescoping system is used. Optical sensors 1207 are placed above the substrate and can measure topological data over a spot size of <15 mm. The XY stage 1208 is scanned in the horizontal plane to cover the entire face of the substrate and collect surface profile data.

Figure 13A:
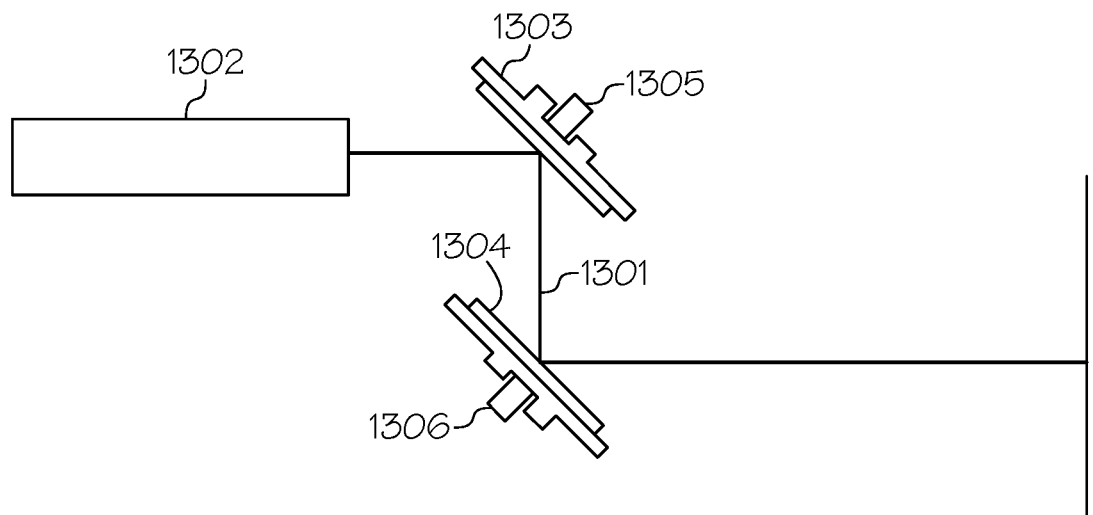
FIGS. 13A-13B illustrate the laser beam alignment module in the nP3 optical metrology module in accordance with an embodiment of the preset invention.
Figure 13B:
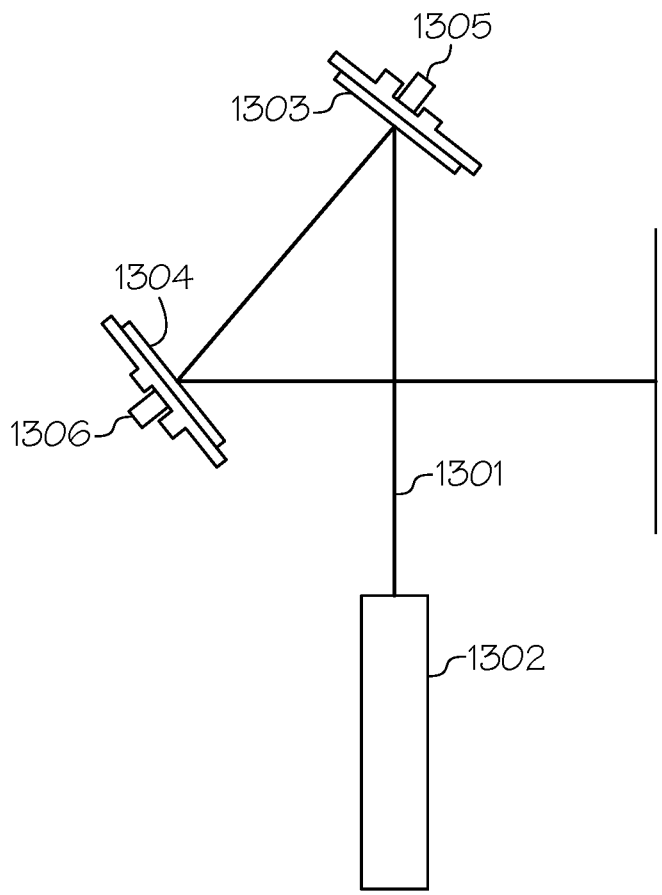

FIGS. 13A-13B illustrate the laser beam alignment module in the nP3 optical metrology module in accordance with an embodiment of the preset invention.

Referring to FIGS. 13A-13B, a laser beam 1301 from a laser 1302 passes through a collimator and neutral density to a pair of alignment mirrors. It is then incident on a pair of turn mirrors 1303, 1304 which direct the rays in the vertical direction to be incident on the substrate (identified as "Target"). These turn mirrors can be aligned based on the desired deflection to the beam path. In one embodiment, these mirrors are 45 degree mirrors. The turn mirror is mounted (see kinematic mounts 1305, 1306) as shown to ensure it is positioned completely below the substrate when the X stage carriage is in the metrology zone.

Figure 14A:
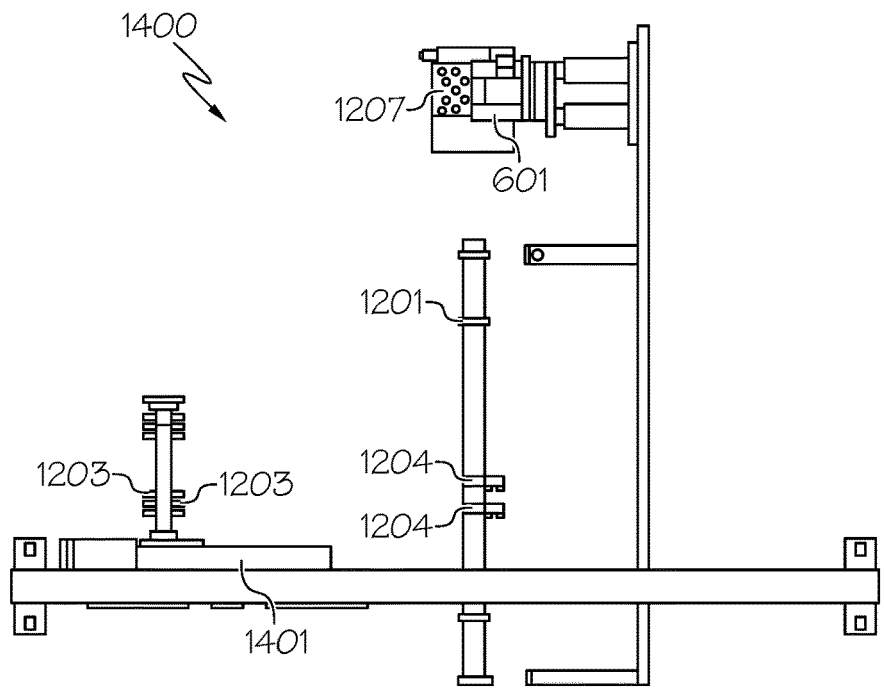
FIGS. 14A-14B illustrate the automated telescoping system in the metrology module in accordance with an embodiment of the present invention.
Figure 14B:
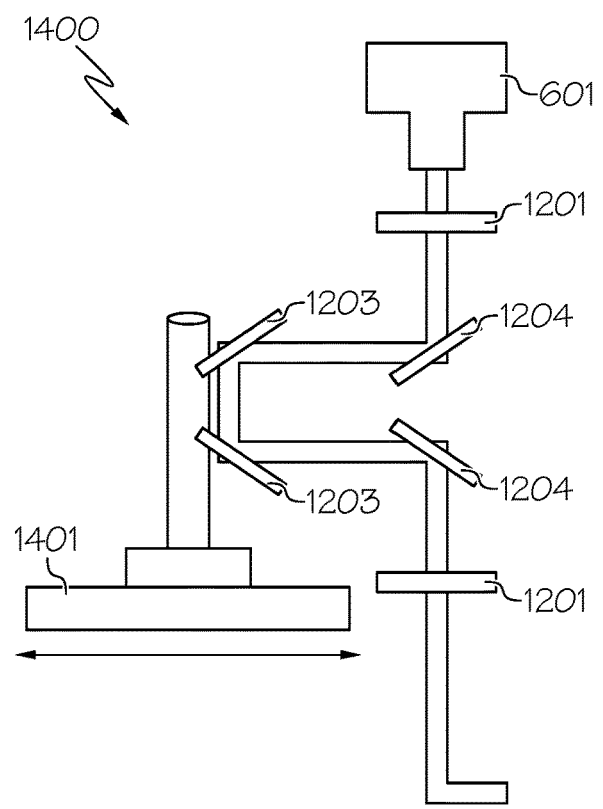

FIGS. 14A-14B illustrate the automated telescoping system 1400 in the metrology module in accordance with an embodiment of the present invention.

Referring to FIGS. 14A-14B, automated telescoping system 1400 includes an optical sensor 1207, alignment stages 601, telescoping lens 1201, translating 45 degree mirror 1203, stationary turn mirror 1204 and translation stage 1401 to adjust the optical path length.

In one embodiment, automated telescoping system 1400 is located downstream of the substrate. As shown in FIGS. 14A-14B, the beam first passes through a convex lens, then to a series of turn mirrors 1203, 1204 and again through a convex lens. The beam exiting the second convex lens is parallel to the sensor axis. To ensure the beam is parallel and the lenses are located conjugate to each other, the optical path length between the lenses is varied by adjusting the position of the turn mirrors 1203, 1204. The mirrors are mounted on a linear stage which can change the optical length between convex lens 1 and 2 such that the exiting beam is parallel for a range of curved substrates with spherical power between −15 D and 15 D. Based on feedback from optical sensor 1207, the optical path length between convex lens 1 and 2 can be automatically adjusted.

In one embodiment, an optical profilometer is used to measure variations in surface topography in the case of a flat substrate. The optical profilometer works on the principle of interference and can detect variations as small as sub 1 nm. In one embodiment, the Shack-Hartman wavefront sensor is used to measure the wavefront of light transmitted through a curved substrate. If the incoming wavefront is planar, deviations in the shape of the wavefront allow the topography of the substrate to be measured. SH sensors have a 2 D array of lenslet focusing light on a sensor pixels. Based on the divergence of the incoming ray and its deviation from a perfectly paraxial ray, surface profile can be measures with an accuracy of sub nm and pitch of 100 micrometers.

Figure 15:
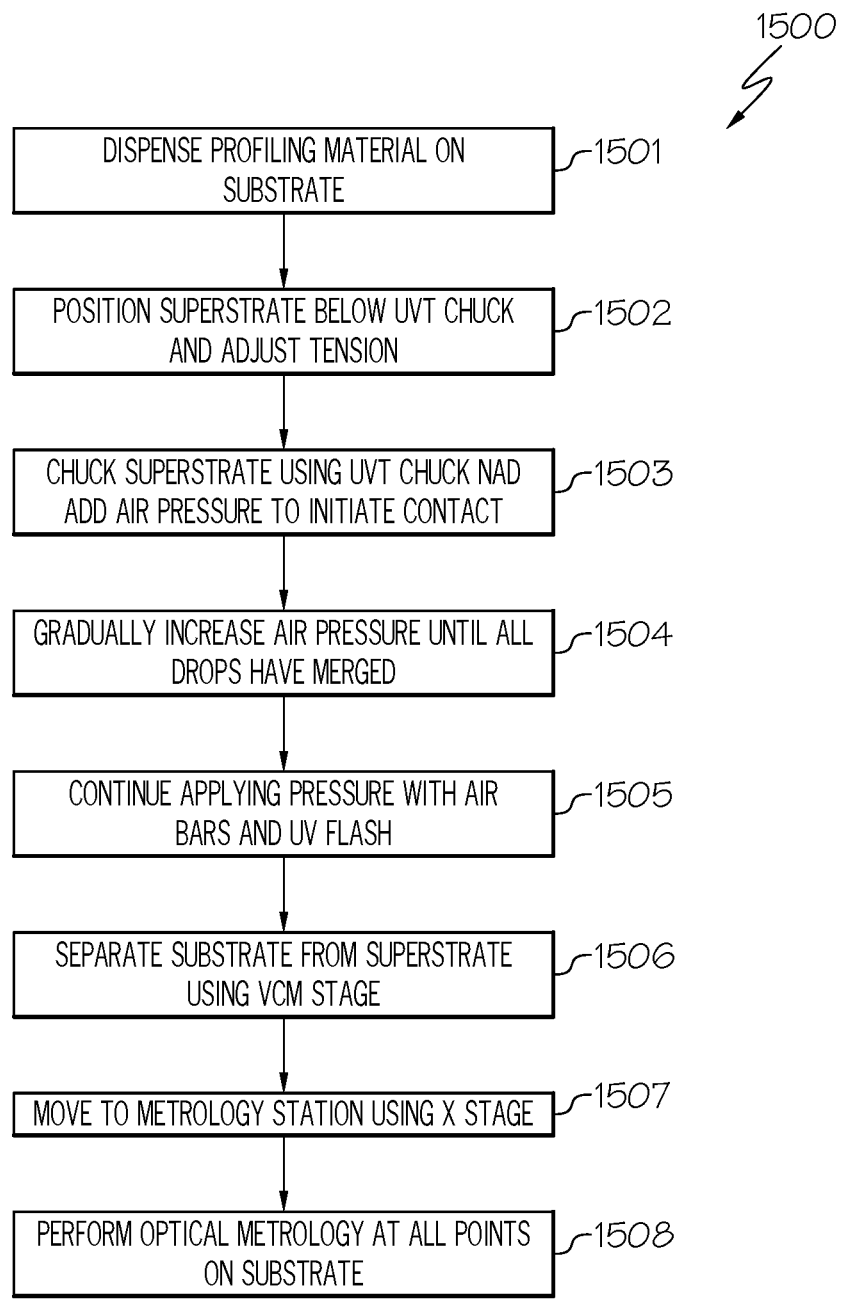
FIG. 15 is a flowchart of a method for performing optical metrology at all points on a substrate in accordance with an embodiment of the present invention.

FIG. 15 is a flowchart of a method for performing optical metrology at all points on a substrate in accordance with an embodiment of the present invention. FIGS. 16A-16H depict the cross-sectional views for performing optical metrology at all points on a substrate using the steps described in FIG. 15 in accordance with an embodiment of the present invention.

Referring to FIG. 15, in conjunction with FIGS. 16A-16H, in step 1501, profiling material 1601 is dispensed on a substrate 1602 using an inkjet 1603 as shown in FIG. 16A. In one embodiment, profiling material dispensing locations are determined using an algorithm run in one of the following locations: a local computer, a remote computer, and a cloud-based computer.

In step 1502, superstrate 1604 is positioned below UVT chuck 1605 and the tension is adjusted as shown in FIG. 16B.

In step 1503, superstrate 1604 is chucked using UVT chuck 1605 as shown in FIG. 16C. Furthermore, in step 1503, air pressure is added to initiate contact (contact between superstrate 1604 and substrate 1602) as shown in FIG. 16C.

In step 1504, air pressure is gradually increased until all drops have merged as shown in FIG. 16D.

In step 1505, pressure with air bars is continually applied with UV (ultraviolet) flash 1606 to form a contiguous film 1607 as shown in FIGS. 16E and 16F.

In step 1506, substrate 1602 is separated from superstrate 1604 using VCM stage 1608 as shown in FIG. 16F.

In step 1507, substrate 1602 and VCM stage 1608 are moved to metrology station 1609 using x stage 1610 as shown in FIG. 16G.

In step 1508, xy stage is scanned to perform optical metrology at all points via laser beam 1611 on substrate 1602 (corresponding to final substrate profile) as shown in FIG. 16H.

A more detailed description of method 1500 in connection with FIGS. 16A-16H is provided below.

During nP3 on flat substrates, a drop pattern 1601 is generated and dispensed on to the flat substrate 1602 over a large area. This is achieved through XY motion of substrate synchronized with jetting cycles. Substrate 1602 is then traversed to the profiling zone underneath the UV lamp and UVT chuck 1605. Tension in superstrate 1604 is adjusted to the desired level as necessitated by the final surface profile. Superstrate 1604 can be a textured or patterned roll, where the lateral spatial length scale of the texture or pattern is at least an order of magnitude lower than the lateral spatial length scale of the desired profile. UVT chuck 1605 is used to then hold superstrate 1604 in place. The voice coil motor driven stage with the substrate mounted on a chuck is brought to the profiling zone with the help of the horizontal XY stages. The vertical tip tilt motion of VCM stage 1608 allows proper alignment of substrate 1602 with superstrate 1604 and gap control. Air pressure is increased in the cavity to create a curvature of the superstrate web which allows the drops to merge and form a contiguous film 1607. This allows mitigation of any entrapped air bubbles. Cameras mounted on UVT chuck 1605 are used to observe bubble entrapment. Using image processing, bubbles are identified and air is automatically pumped on superstrate 1604 at targeted locations to ensure drops there spread and the bubbles are mitigated. After a specified amount of time necessary for capillary forces to create the desired topography, the profiling material is UV cured. VCM stage 1608 is used to separate substrate 1602 from superstrate 1604 through its vertical motion. Substrate 1602, along with VCM stage 1608, is brought to metrology station 1609. VCM stage 1608 helps align substrate 1602 face at the point of measurement with the optical axis of optical profilometer. A laser beam 1611 is transmitted through substrate 1602 onto the SH sensor through an automated telescopic system (to account for different powers). The XY stages are used to scan substrate 1602 in the horizontal plane to measure topography at every location on substrate 1602. Once the measurement is performed, a decision is made on whether further processing is required (e.g., in-case of multistep processes where surface topography has a high amplitude). The horizontal stages bring the substrate back to the profiling zone if processing is required. The communication module in the tool can be used to transfer and exchange data related to the substrate metrology, tool sensors and drop pattern.

Figure 17:
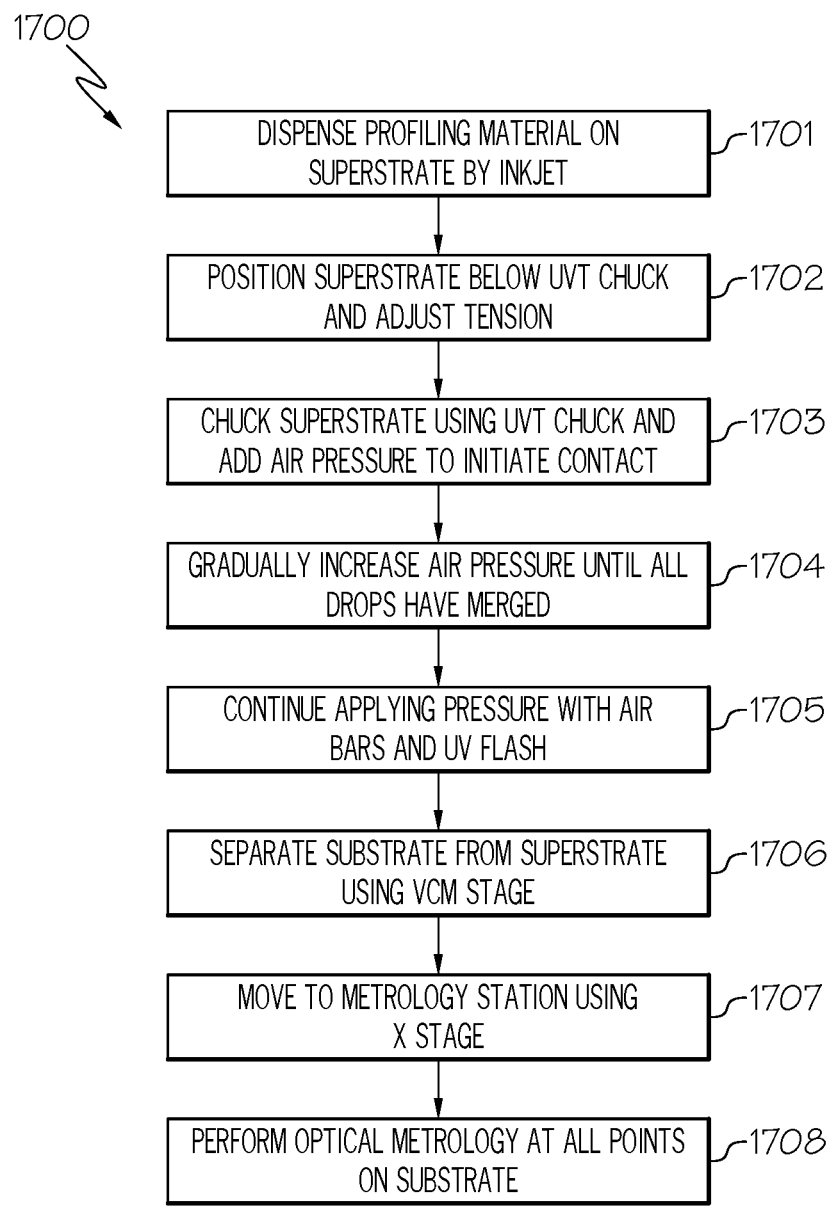
FIG. 17 is a flowchart of a method for performing optical metrology at all points on a curved substrate for nP3 in accordance with an embodiment of the present invention.

FIG. 17 is a flowchart of a method for performing optical metrology at all points on a curved substrate for nP3 in accordance with an embodiment of the present invention. FIGS. 18A-18H depict the cross-sectional views for performing optical metrology at all points on a curved substrate for nP3 using the steps described in FIG. 17 in accordance with an embodiment of the present invention.

Referring to FIG. 17, in conjunction with FIGS. 18A-18H, in step 1701, profiling material 1801 is dispensed on a superstrate 1802 using an inkjet 1803 as shown in FIG. 18A. In one embodiment, profiling material dispensing locations are determined using an algorithm run in one of the following locations: a local computer, a remote computer, and a cloud-based computer.

In step 1702, superstrate 1802 is positioned below UVT chuck 1804 and the tension is adjusted as shown in FIG. 18B. FIG. 18B also illustrates substrate 1805.

In step 1703, superstrate 1802 is chucked using UVT chuck 1804 as shown in FIG. 18C. Furthermore, in step 1703, air pressure is added to initiate contact (contact between superstrate 1802 and substrate 1805) as shown in FIG. 18C.

In step 1704, air pressure is gradually increased until all drops have merged as shown in FIG. 18D.

In step 1705, pressure with air bars is continually applied with UV (ultraviolet) flash 1806 to form a contiguous film 1807 as shown in FIGS. 18E and 18F.

In step 1706, substrate 1805 is separated from superstrate 1802 using VCM stage 1808 as shown in FIG. 18F.

In step 1707, substrate 1805 and VCM stage 1808 are moved to metrology station 1809 using x stage 1810 as shown in FIG. 18G.

In step 1708, xy stage is scanned to perform optical metrology at all points via laser beam 1811 on substrate 1805 (corresponding to final substrate profile) as shown in FIG. 18H.

A more detailed description of method 1700 in connection with FIGS. 18A-18H is provided below.

The steps for the nP3 process on nominally non-flat substrates are now enumerated. A "non-flat" substrate, as used herein, refers to a substrate with a surface that is not flat (without a smooth and even surface). While this description is related to substrates with a nominal spherical curvature, substrates with a nominal aspherical curvature and other freeform substrate profiles can also be processed using the same process flow.

During nP3 on curved substrates, a profiling material drop pattern 1801 is generated and dispensed on to superstrate 1802. Superstrate 1802 can also be a textured or patterned roll, where the lateral spatial length scale of the texture or pattern is at least an order of magnitude lower than the lateral spatial length scale of the desired profile. The superstrate web speed is synchronized with jetting timing cycle to maintain drop placement accuracy. The drop locations also correspond to the desired locations on the non-flat substrate 1805 such that upon conformal contact with substrate 1805, the drops are located at where they need to be on substrate 1805. The superstrate region with the deposited drops is traversed to the profiling zone underneath the UV lamp 1806 and UVT chuck 1804. Tension in superstrate 1802 is adjusted to the desired level as necessitated by the final surface profile. UVT chuck 1804 is used to then hold superstrate 1802 in place. The voice coil motor driven stage with substrate 1805 mounted on a chuck is brought to the profiling zone with the help of the horizontal XY stages. The chuck can be a three pin mount to support varying curvatures. The vertical tip tilt motion of VCM stage 1808 allows proper alignment of substrate 1805 with superstrate 1802 and gap control. Air pressure is increased in the cavity to create a curvature of the superstrate web which allows the drops to merge and form a contiguous film 1807. This allows mitigation of any entrapped air bubbles. Cameras mounted on UVT chuck 1804 are used to observe bubble entrapment. Using image processing, bubbles are identified and air is automatically pumped on superstrate 1802 at targeted locations to ensure drops there spread and the bubbles are mitigated. After a specified amount of time necessary for capillary forces to create the desired topography, the profiling material is UV cured. VCM stage 1808 is used to separate substrate 1805 from superstrate 1802 through its vertical motion. Substrate 1805, along with VCM stage 1808, is brought to metrology station 1809. VCM stage 1808 helps align the normal to the curved face of substrate 1805 at the point of measurement with the optical axis of the SH sensor. A laser beam 1811 is transmitted through substrate 1805 onto the SH sensor through an automated telescopic system (to account for different powers). The XY stages are used to scan substrate 1805 in the horizontal plane to measure topography at every location on substrate 1805. Once the measurement is performed, a decision is made on whether further processing is required (e.g., in-case of multistep processes where surface topography has a high amplitude). The horizontal stages bring substrate 1805 back to the profiling zone if processing is required. The communication module in the tool can be used to transfer and exchange data related to the substrate metrology, tool sensors and drop pattern.

In one embodiment, in-situ metrology may be conducted with the help of an optical profilometer, Shack-Hartmann sensor or both. The signal should be decoupled from the noise in the metrology, where such noise can come from multiple sources, such as beam intensity fluctuations, distortions in the optics used in the beam path, mechanical vibrations, camera sensor noise, thermal fluctuations, etc. These noise sources need to be characterized from time to time to ensure that the tool is running robustly. Some of this noise is systematic in nature and can be eliminated from the signal (e.g., presence of aberrations in the optics). However, some of this noise may be random and can distort the signal substantially. For example, vibrations are a significant source of random noise that can degrade the signal by causing the optomechanical mounts or the beam path to displace, with larger beams or optics causing more pronounced deviations. Such vibrations are typically manifested as fluctuations in the lower order aberrations (tip, tilt, defocus and astigmatism), and usually do not affect the higher order aberrations by staying within +/−10 nm of the desired Zernike coefficient of the HOAs. Hence, the area of HOA correction for ophthalmics as described later, does not suffer from a lack of measurement accuracy. In order to minimize the fluctuations in the measurement of lower order aberrations for precision optics, multiple measurements can be taken to extract an averaged signal, using noise filtering techniques, such as Kalman filters. This technique may lead to slower throughput, but can provide higher measurement accuracy for the profiling of precision optical substrates.

The formulation design consists of a UV-curable profiling material-like material comprising of considerable amount of components. Appropriately formulated systems may perform satisfactorily under a range of compositions. Formulation design may take into account the expected amount of material that needs to be evaporated, such that the optimum range of component ratios is not disrupted. Further, certain components, such as the photoinitiator or crosslinkers, will almost always be less volatile, as seen in the table below.

A profiling material formulation may contain a mixture of some, or all the following components: an initiator; polymerizable monomers with one active group; polymerizable monomers with more than one active group referred to in the art as crosslinkers; and surfactants. This list is not exhaustive as other components may be present according to desired performance and applications.

Example for relevant components is shown in the table below:

| Role | Material | Boiling Point (° C. at 1 atm) |
| --- | --- | --- |
| Monomers | 2-Ethylhexyl methacrylate | 218 |
|  | Cyclohexyl methacrylate | 210 |
|  | Isobornyl methacrylate | 258 |
|  | Tetrahydrofurfuryl methacrylate | 222 |
|  | Benzyl methacrylate | 243 |
| Crosslinker | Ethylene glycol dimethacrylate | 240 |
| Surfactant | 1H,1H,2H,2H-Perfluorodecyltriethoxysilane | 209 |
| Photoinitiators | Irgacure 184 | >300 |
|  | Irgacure 819 | >300 |
|  | Irgacure 2959 | >300 |

Downstream process considerations may preclude the use of UV-crosslinkable polymers. For example, most methacrylate polymers have a Tg of ~150° C. Any downstream thermal processing beyond 150° C. may damage the material. There are other thermoset polymers, such as polyimide, that have a much higher Tg of ~350° C. Hence, using this polymer can alleviate concerns with thermal processing. But these materials are also highly viscous, which makes them difficult to coat with substantially lower volumes. To achieve this, the polyimide material can be diluted in a solvent, which can reduce their viscosity and make the material amenable to coating. The solvent will need to be completely evaporated to minimize condensation on the substrate. This can be done by using a solvent with substantially higher volatility (e.g., MIBK, ethyl acetate) and using a heated substrate chuck or IR lamps to completely and rapidly evaporate the solvent.

The superstrate roll can be created with the help of different plastic materials, e.g., polycarbonate, PET, PEN, polyimide, etc. It can also be made of flexible glass (e.g., Willow glass from Corning). In one embodiment, the superstrate does not have a texture or pattern to it. The texture or pattern can be used to impart functional properties to the substrate in addition to the desired profile. For example, a nanoscale texture in the form of conical pillars can provide anti-reflective properties at an interface as a moth-eye structure. This precludes the need to deposit alternating films of low- and high-refractive index. Hence, a texture combined with a profile can impart anti-reflective aberration control on substrates. A nanoscale pattern can be similarly used to impart self-cleaning properties, for example, in situations where profile correction is desired on a surface that may be exposed to the ambient. In one embodiment, the superstrate has a texture or pattern, where the lateral spatial length scale of the texture is at least an order of magnitude lower than the same for the desired profile on the substrate. In one embodiment, this texture is similar to a moth-eye structure. In one embodiment, the texture or pattern is formed of the same profiling material on the substrate. In one embodiment, the texture or pattern is formed of a different material than the profiling material.

A fluid-template interaction model is used to calculate effect of capillary forces on a tensioned web, particularly to check if the web collapses under capillary forces. A quantified relation between applied tension and film thickness variation is also found. Based on lubrication theory which characterize thin film flows, the following PDEs govern the physics of the fluid-web interaction.

$$\frac{\partial h}{\partial t} = \frac{\partial}{\partial x}\left\{\frac{h_1^2}{12\mu}\frac{\partial P_f}{\partial x}\right\}; P_f - P_a = -T_0\frac{\partial^2 h_1}{\partial x^2}; -P_a = -T_0\frac{\partial^2 h_2}{\partial x^2}$$

where h1=profiling material film thickness, h2=gap of template web from substrate in region not containing profiling material, Pf=fluid pressure, Pa=pressure from air bearings, T0=applied web tension. A solution is assumed of the below format.

$$h_1 = \alpha_0 + \alpha_1 x + \alpha_2 x^2 \alpha_3 x^2 + \sum_{i=1}^{nmax} A_i(t)\cos\left(\frac{i\pi x}{c}\right); h_2 = b_0 + b_1 x + b_2 x^2;$$

Using continuity, differentiability and capillary pressure difference boundary conditions at fluid-air interface and symmetry elsewhere, the equations can be solved numerically.

Figure 19A:
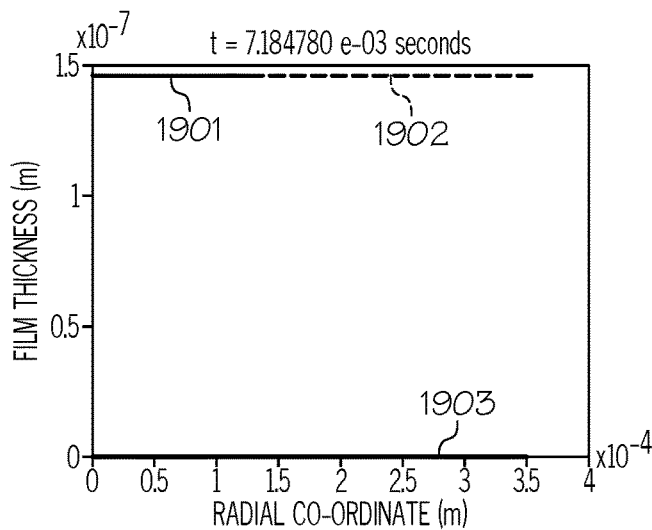
FIGS. 19A-19C graphically denote the effect of profiling material capillary forces on a tensioned web superstrate at various instances in accordance with an embodiment of the present invention.
Figure 19B:
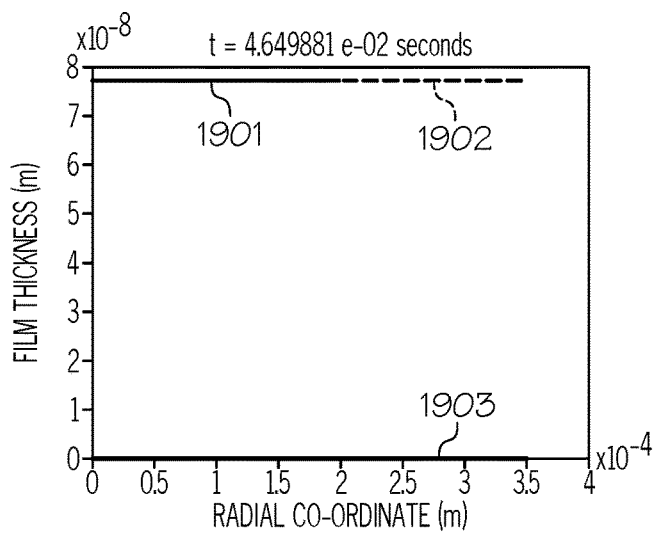
Figure 19C:
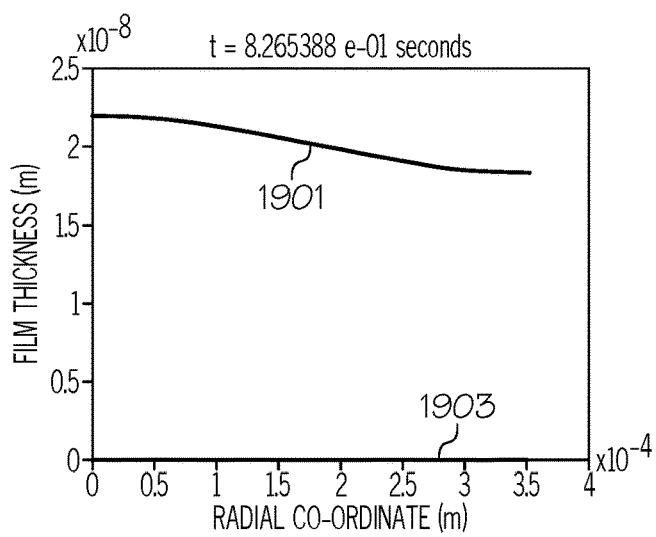

FIGS. 19A-19C graphically denote the effect of profiling material capillary forces on a tensioned web superstrate at various instances in accordance with an embodiment of the present invention. Line 1901 denotes the region with profiling material liquid and the superstrate web profile therein and line 1902 denotes the superstrate web profile in region with no profiling material Line 1903 denotes the substrate. The above graphs show spreading of a drop under capillary forces and a tensioned web. A film thickness variation is observed to be unavoidable for low applied tensions.

The prevention of contamination is an important aspect of this tool. Typically, particle contamination can be minimized by maintaining a positive pressure inside the tool along with constant re-circulation. The air handling inside the tool can be based on cross-flow, so that venting of air to the user is minimized while maintaining a positive pressure inside the tool.

A digital twin of a manufacturing tool is a model-based representation of the tool which is used to monitor and predict the performance and yield of the tool. The digital twin is often used in advanced manufacturing environments (e.g., semiconductor manufacturing) where there is availability of substantial amount of data from sensors in the tool. The data from the sensors is then analyzed with respect to the output of the tool (in terms of yield, performance, etc.) with the help of data analytics techniques such that a model of the tool is constructed. This model can be completely data-based or also have a physics-based underpinning. In one embodiment of this invention, a digital twin is created for the nP3 tool.

Human vision can be severely affected by the presence of higher order aberrations (HOAs) that are typically not corrected by conventional spectacle lenses. This can lead to halos, starbursts, ghost images, etc. especially when working in low light conditions, such as night driving. HOAs are expressed in the form of Zernike polynomials. Typical HOAs that are present in human eyes and are known to degrade visual acuity include coma, trefoil and spherical aberration. Each eye has a unique HOA profile, and can have multiple aberrations at the same time. The use of the nP3 process to fabricate HOA-correcting lenses for use in human vision is disclosed here.

Conventional spectacle lenses are fabricated by using a diamond machining tool to cut an injection molded lens blank to the desired optometric prescription (which typically consists of a spherical power, a cylindrical power, an "add" power to address presbyopia, and geometric parameters such as the interpupillary distance, etc.). The lens blanks are made of materials, such as polycarbonate, CR-39, and Trivex, and are typically available in intervals of 0.25 D or 0.125 D powers and diameters of 65-80 mm. These lens blanks are thereby curved and may also be coated with a "hard-coat" to provide scratch resistance and to reduce the presence of diamond machining artifacts, as well as an anti-reflective coating to increase transmission through the lens.

Conventionally fabricated spectacle lenses are unable to correct for HOAs, which can be a problem and can prevent people from achieving their best vision. The principles of the present invention disclose the use of the nP3 process for curved substrates (as described above) to deposit a programmable film of profiling material on a lens blank such that the necessary profile to correct HOAs can be added to an existing lens blank, which already corrects for the patient's manifest spherical and cylindrical power. This allows customization of each lens blank to the HOA profile of an eye, and does so without having signatures, such as tool marks from diamond machining or roughness from the orange peel effect as a result of unequal evaporation of a liquid coating. Moreover, a profiling material with a refractive index substantially similar to the lens blank material can allow the creation of a seamless optical interface between the underlying lens blank and the HOS profile. For example, the refractive index of polycarbonate (~1.55) is very similar to that of acrylate-based profiling material (~1.54), making this combination well suited for nP3 on polycarbonate lens blanks.

For this purpose, the HOAs in an eye are first measured using a wavefront aberrometer (e.g., Nidek OPD Scan series) or a trial lens set with individual HOAs (described below). The inverse HOA profile that can substantially correct the HOAs present in the eye is generated. This inverse HOA profile may not cancel all present HOAs completely, and the amount of cancelation needed to substantially improve visual acuity to cater to the individual's lifestyle can be obtained with the help of optical models and simulations. These models and simulations include techniques such as geometric ray tracing, wavefront analysis, Fourier optics, as well as through an analysis of the wavefront phase, Modulation Transfer Function (MTF), Point Spread Function (PSF), etc. For example, an artist may want excellent resolution and compromise on depth perception, whereas a driver may want better depth perception to go with a reasonable resolution. Hence, for the former, substantial cancelation of all HOAs may be important, whereas for the latter, some HOAs may be intentionally created to allow better depth of focus in exchange for resolution. In addition to the HOA profile, the pupil diameter is also measured. Based on an individual's preference, this measurement may also be tailored to different lighting conditions, as a pupil is more dilated in low-light conditions. For example, an individual desiring correction of poor night vision may want this measurement to happen in low-light conditions.

After measuring the HOA profile, a drop pattern is generated based on the desired HOA profile as well as the topography of the lens blank that will be used. The topography of the lens blank may be measured in the nP3 tool in the metrology section, and should substantially match the desired spherical and cylindrical power for the eye. The desired drop pattern may be generated locally, remotely, or in the cloud. The desired HOA profile can be converted to film thickness by scaling it with a factor of $(1/n-1)$, where n is the refractive index of the film. In one embodiment, the area across which the drop pattern is generated, and across which the nP3 process is executed is equal to the pupil area measured above. In one embodiment, this area is different from the pupil area. In one embodiment, this area is larger than the pupil area to account for off-axis viewing across an angle corresponding to the best foveal angular resolution (+/−5 degrees). In one embodiment, this area is larger than the pupil area to account for off-axis viewing across an angle corresponding to +/−15 degrees (representing a high enough angular resolution). In one embodiment, this area is larger than the pupil area to account for off-axis viewing across an angle corresponding to +/−60 degrees (representing an angular resolution sufficient for binocular vision). In one embodiment, multiple such areas may be located on a single lens blank to allow the eye to move relative to the head and look through multiple areas on the blank. In one embodiment, these multiple areas are blended together into a single larger area. In one embodiment, the desired HOA correcting profile is transitioned into the background substrate with no HOA profile with the help of a smooth blending function (e.g., Haning window), rather than a sharp cliff at the transition. In one embodiment, the spectacle lens is actuated based on feedback from an eye-tracker, where the HOA-correcting zone in the lens is positioned substantially parallel to the visual axis of the eye. This "active" centration method can improve visual acuity, and lead to "supernormal vision" as the incoming wavefront is corrected and focused on the fovea, even when the eye moves relative to the head. The power source, actuators and sensors for this embodiment may be placed on a specially designed spectacle frame.

In some cases, the desired HOA profile may lead to the deposition of a film with thickness exceeding the maximum allowable thickness on the tool. Such cases include the presence of disorders such as keratoconus, in which the cornea is shaped more like a cone rather than a sphere, and which leads to abnormally high values for HOAs such as coma. In such cases, the film may be deposited across multiple steps, where each step can cater to some fraction of the desired HOA/film thickness profile, without introducing substantial process and metrology errors. Intermediate metrology can be conducted at the conclusion of nP3 for each step, and if desired, a drop pattern may be generated to correct any errors in the prior step as well as to deposit the film for the next step. Even when multiple steps may not be needed, a second step as described in this paragraph may be used to clean up any errors in the first step with the film deposited in the first step remaining on the substrate. The presence of in-situ metrology in the tool allows this to happen without the substrate being unmounted from the tool.

In one embodiment, the nP3 process can be carried out on lens blanks that have the hard coat layer. Following the nP3 process, an anti-reflective coating can be deposited according to standard practice in the lens manufacturing industry. In one embodiment, the nP3 process is carried out on bare lens blanks after which the hard coat and any anti-reflective coating is deposited. In one embodiment, the nP3 process is carried out on a lens blank which has a tint. In one embodiment, the nP3 process is carried out on a lens blank which already has a coating.

Trial lenses are used by optometrists to determine the prescription of an individual. They consist of glass plates/lenses with varying spherical and cylindrical power that can be encased in a metal ring. They are mounted on trial frames sequentially and allow the optometrist to try different combinations to determine the optimum prescription of the patient. Currently available trial lenses only correct for the lower order aberrations, i.e., tip/tilt, defocus and astigmatism, but do not address any higher order aberrations. The nP3 process can be used to generate a trial lens set with individual HOA modes (e.g., coma, trefoil and spherical aberration), with varying amplitudes for each mode. For example, a trial lens set for spherical aberration can address aberrations with Zernike coefficient ranging from −0.5 to 0.5 microns in steps of 0.05 microns for a pupil diameter of 7 mm. Moreover, these HOA correcting trial lenses can be fabricated on flat plates using the nP3 process on flat substrates, because these lenses do not need to have spherical/cylindrical power. When used in series with conventional trial lenses (having sphere and cylinder power) on the same trial frame, they can be used to measure the approximate HOAs of an individual eye in conjunction with the standard lower order aberrations. These lenses can also be used to simulate the effect of correction of HOAs on visual acuity.

In one embodiment, different trial lenses can be fabricated with varying area over which HOA profiles are generated corresponding to different pupil diameters. The desired HOA profile can be converted to film thickness by scaling it with a factor which depends on the refractive index of the film as well as the substrate. In one embodiment, the area across which the drop pattern is generated, and across which the nP3 process is executed accounts for off-axis viewing across an angle corresponding to the best foveal angular resolution (+/−5 degrees). In one embodiment, this area accounts for off-axis viewing across an angle corresponding to +/−15 degrees (representing a high enough angular resolution). In one embodiment, this area accounts for off-axis viewing across an angle corresponding to +/−60 degrees (representing an angular resolution sufficient for binocular vision). In one embodiment, multiple such areas may be located on a single trial lens to allow the eye to move relative to the head and look through multiple areas on the blank. In one embodiment, these multiple areas are blended together into a single larger area. In one embodiment, the desired HOA correcting profile is transitioned into the background substrate with no HOA profile with the help of a smooth blending function (e.g., Haning window), rather than a sharp cliff at the transition. In one embodiment, several aberrations can be combined into a single trial lens substrate, for example, to substantially correspond to typical human HOA profiles or customized to an individual eye's HOA profile. Such a trial lens can be used to simulate the effect of HOA correction on an individual's eye before a similar profile is generated on an actual lens blank. In one embodiment, the transmission of light through a single trial lens substrate exceeds 90%. In one embodiment, the transmission of light through three trial lens substrates held in series exceeds 90%. In one embodiment, the transmission of light through five trial lens substrates held in series exceeds 90%.

Precision optical elements include mirrors and lenses for a wide variety of applications. Depending on the application, such elements may need to be fabricated from different substrate materials, and can either be flat, freeform or nominally curved. The nP3 process can be used to either correct the existing topography on a substrate to match a desired topography, or can be used to generate an entirely different profile from a starting substrate. In some applications, the nP3 process deposits a functional film which is left behind on the substrate. For example, for optical applications, the functional material may be a film with a refractive index which is substantially matched with that of the substrate at one or more wavelengths. For some applications, the nP3 process deposits a sacrificial film which can then be used to transfer the profile of the film into the substrate using an etching step. These applications include those where the presence of a polymer film can degrade the functionality of the substrate and thus needs to be removed, for example for high intensity laser beam optics. The etching step is usually conducted in a reactive ion etching (RIE) chamber using a plasma process and can be tuned to get the desired ratio between the etch rate of the sacrificial profiling material and the underlying substrate material. In one embodiment, the ratio of the etch rates of the polymer and the underlying substrate or layer can be tuned from 0.1 to 10. Based on the etch rate ratio, the profile of the polymer film can also be tuned to obtain the desired profile on the substrate within any specified tolerances. The etching step itself can be broken down into multiple coarse and fine steps, where a substantial amount of material can be removed in the coarse steps with high etch rates for high throughput, with the fine steps correcting the errors in the desired profile. Intermediate metrology can be conducted between the coarse and fine steps. Further, in some applications, an additional uniform film may be deposited on the nP3 process film. For example, a uniform metal layer may be deposited after the nP3 process such that it can render optical reflective properties with the appropriate profile to a substrate. Some exemplar applications of the nP3 process towards precision optical surfaces are described next.

AR/MR, collectively XR, headsets require the use of high-refractive index waveguides that propagate light from a display to a pupil near the eye. This virtual image is superimposed on the real world perceived by the eye. These waveguides typically have gratings that couple at least one wavelength of the light incident on the gratings from a microdisplay into the waveguides at an angle that allows the light to undergo total internal reflection into the waveguide. The light is then coupled out of the waveguide with the help of one or more gratings. These waveguides are fabricated from substrates that need to have good flatness and/or total thickness variation (TTV). This is because substantial deviations from a flat waveguide with near zero TTV will either shift the light beam from the desired path or cause the beam to change its diameter, thereby distorting the virtual image with respect to the real image. Moreover, these headsets may have multiple waveguides, with each waveguide addressing one or more wavelengths. Hence, if each waveguide causes its beam to shift differently from another waveguide in the same headset, the combined image may lead to chromatic aberrations.

Simulations indicate that the higher the number of reflections in a waveguide, the higher the distortion in the image at the exit pupil of the waveguide. The number of reflections is increased by increasing the distance between the incoupling gratings and the outcoupling gratings or the exit pupil. Hence, rays of light that travel further into the waveguide suffer from higher deviation than desired, if the waveguide is imperfect. The number of reflections is also increased when the substrate thickness is reduced to lower the weight of the waveguide and thereby the headset itself.

The nP3 process for flat substrates can be used to correct the flatness and TTV in transparent waveguide substrates by depositing a film that corrects the inherent TTV and/or flatness error in the substrate. In one embodiment, the starting substrate can be of lower quality which does not meet the flatness/TTV specs. In one embodiment, the starting substrate can be a substrate with thickness lower than currently available (for example, 100 micrometers). In one embodiment, the starting substrate has specs that meet the desired specs and obtain a substantial improvement after the nP3 process. Since the waveguide substrates typically have a refractive index of 1.6 and higher, a sacrificial film may be used for depositing the profile and then transferring the same to the substrate. Alternatively, high index profiling material materials, as developed by companies such as Microresist and NTTAT, may also be used as a functional film that is left behind if the index closely matches that of the substrate, and if spurious reflections off the interface do not lead to a substantial loss in light intensity. In one embodiment, flatness/TTV correction can be combined with texturing of a moth-eye structure for anti-reflective properties. In one embodiment, both sides of a substrate are profiled, and may also have texturing.

High energy lasers are being used in defense applications and require tight control over the beam shape to retain focused laser intensity over extremely long ranges (kms and higher). These mirrors are typically fabricated using SiC and Si substrates. The nP3 process for flat substrates with a sacrificial film, combined with an etching step of the sacrificial film, can be used to fabricate optics with the desired profiles. Moreover, a single corrector plate can be fabricated that can correct the errors in the beam profile of an existing laser system, and which can be installed in the beam path to correct the said errors. In one embodiment, an optic for a high energy laser system is a flat substrate with peak-valley flatness better than lambda/10. In one embodiment, an optic for a high energy laser system is a curved substrate with peak-valley deviation from the nominal form better than lambda/10. In one embodiment, an optic for a higher energy laser system is a corrector plate with peak-valley deviation from the desired form better than lambda/10.

Metasurfaces and flat lenses are nanopatterned flat substrates that exhibit lens-like behavior because of their sub-wavelength interaction with one or more specific wavelengths of light. Common lens surfaces are typically designed to have a spherical phase profile. These introduce spherical aberrations but minimize off-axis aberrations (e.g., coma). Metalens surfaces are usually designed to have a "hyperbolic" phase profile. These introduce off-axis aberrations (e.g., coma), but minimize spherical aberrations. The presence of these aberrations limits the NA of metalenses. Fabrication tolerances, as well as substrate flatness/TTV may also lead to undesirable aberrations. Correction of both aberrations simultaneously has been demonstrated with a multi-surface lens, or a separate corrector plate. Instead of a separate metalens surface or a corrector plate, the nP3 process can be used to either create a low-cost corrector plate or profile the back surface of the metalens substrate to correct all of the following aberrations at once by either using a sacrificial film that is etched or using an index-matched film which is left behind: systematic aberrations resulting from the design of the phase pattern, systematic aberrations resulting from off-axis imaging, random aberrations resulting from fabrication errors and tolerances, and random aberrations resulting from substrate non-flatness/TTV.

In the above scenarios, a textured or patterned profile can be deposited using a textured or patterned superstrate to impart other functional properties, such as anti-reflection. The use of the nP3 process can enable the following: increased substrate-to-substrate uniformity by customizing the nP3 profile based on the aberration profile from the fabricated metalens and substrate combination, increased variety of phase profiles that can be generated from a single nanopattern, relaxed constraints on the design of metalenses and relaxed process constraints during the fabrication of metalenses.

Other applications where the nP3 process may be used on flat or curved substrates include: substrates for free space optics for the next generation of long-range communication, substrates for X-ray mirrors, optics for space applications, optics for photolithography tools and optics for other instruments, such as telescopes, microscopes, cameras, inspection machines, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system for nanoscale precision programmable profiling, the system comprising:
    a profiling module, wherein said profiling module has an inkjet for dispensing profiling material;
    a subsystem for handling a roll-based superstrate, wherein said superstrate is used to form a contiguous film of said profiling material between said superstrate and a substrate;
    a subsystem for handling said substrate comprising a vacuum chuck and a vertical tip-tilt stage, wherein an intermittent movement of said vacuum chuck with said vertical tip-tilt stage enables a formation of said contiguous film of said profiling material;
    a subsystem for curing said profiling material; and
    a metrology module.

2. The system as recited in claim 1, wherein said profiling module further comprises:
    a subsystem for alignment of said superstrate with said substrate.

3. The system as recited in claim 1, wherein said profiling module further comprises:
    a subsystem for mitigation of bubbles when forming a contiguous film of said profiling material between said superstrate and said substrate.

4. The system as recited in claim 1, wherein said superstrate has a portion that is textured or patterned.

5. The system as recited in claim 1, wherein said substrate is fixed on said vacuum chuck that translates on a stage between said profiling and metrology modules.

6. The system as recited in claim 1, wherein said substrate is nominally flat.

7. The system as recited in claim 1, wherein said substrate is nominally non-flat.

8. The system as recited in claim 1, wherein said subsystem for curing said profiling material comprises an ultraviolet transparent vacuum chuck.

9. The system as recited in claim 1, wherein said metrology module comprises one or more of the following: a Shack-Hartmann wavefront sensor, an interferometer, an optical profilometer, a reflectometer, and a spectrophotometer.

10. The system as recited in claim 1, wherein said system is used to profile precision optical components or XR waveguide substrates.

11. The system as recited in claim 1, wherein said system is used to correct flatness or total thickness variation (TTV) errors in substrates.

12. The system as recited in claim 1, wherein said system is used to profile ophthalmic or trial lenses with higher order aberrations.

13. The system as recited in claim 1 further comprising:
    a module for communication, data transfer and exchange with one of the following: a local computer, a remote computer, a cloud-base datacenter and a cloud-based workstation.

14. The system as recited in claim 1, wherein profiling material dispensing locations are determined using an algorithm run in one of the following locations: a local computer, a remote computer, and a cloud-based computer.

* * * * *

UNITED STATES PATENT AND TRADEMARK OFFICE
CERTIFICATE OF CORRECTION

PATENT NO. : 12,168,244 B2
APPLICATION NO. : 17/801481
DATED : December 17, 2024
INVENTOR(S) : Sreenivasan et al.

Page 1 of 1

It is certified that error appears in the above-identified patent and that said Letters Patent is hereby corrected as shown below:

In the Specification

Please replace "$h_1 = \alpha_0 + \alpha_1 x + \alpha_2 x^2 \alpha_3 x^2 + \sum_{i=1}^{nmax} A_i(t)\cos\left(\frac{i\pi x}{c}\right); h_2 = b_0 + b_1 x + b_2 x^2;$" at Column 13, Line 40 with "$h_1 = a_0 + a_1 x + a_2 x^2 + a_3 x^3 + \sum_{i=1}^{nmax} A_i(t)\cos(\frac{i\pi x}{c}); h_2 = b_0 + b_1 x + b_2 x^2;$".

Signed and Sealed this
Eighteenth Day of February, 2025

Coke Morgan Stewart
*Acting Director of the United States Patent and Trademark Office*